US009524648B1

(12) United States Patent
Gopalakrishnan et al.

(10) Patent No.: US 9,524,648 B1
(45) Date of Patent: Dec. 20, 2016

(54) COUNTERMEASURES FOR THREATS TO AN UNCREWED AUTONOMOUS VEHICLE

(71) Applicant: AMAZON TECHNOLOGIES, INC., Seattle, WA (US)

(72) Inventors: Varadarajan Gopalakrishnan, Cupertino, CA (US); Jesper Mikael Johansson, Redmond, WA (US); James Domit Mackraz, Palo Alto, CA (US); Jon Arron McClintock, Seattle, WA (US); Brandon William Porter, Yarrow Point, WA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 70 days.

(21) Appl. No.: 14/543,198

(22) Filed: Nov. 17, 2014

(51) Int. Cl.
*G05D 1/00* (2006.01)
*H04N 7/00* (2011.01)
*G08G 5/00* (2006.01)

(52) U.S. Cl.
CPC .......... *G08G 5/0082* (2013.01); *G05D 1/0027* (2013.01); *G08G 5/0069* (2013.01)

(58) Field of Classification Search
USPC .............................................. 701/2; 348/117
See application file for complete search history.

(56) References Cited

U.S. PATENT DOCUMENTS

| 8,908,573 | B1 * | 12/2014 | Wang | H04L 5/26 370/280 |
| 2005/0223288 | A1 * | 10/2005 | Berbaum | G06F 11/27 714/29 |
| 2008/0191924 | A1 * | 8/2008 | Duff | G01S 7/38 342/14 |
| 2010/0302359 | A1 * | 12/2010 | Adams | B64C 39/024 348/117 |
| 2011/0046817 | A1 * | 2/2011 | Hamke | G05D 1/101 701/3 |
| 2011/0202203 | A1 * | 8/2011 | Johansson | G05D 1/0022 701/2 |
| 2013/0133026 | A1 * | 5/2013 | Burgess | G06F 21/62 726/1 |
| 2014/0222248 | A1 * | 8/2014 | Levien | B64C 39/024 701/2 |
| 2015/0203213 | A1 * | 7/2015 | Levien | G01C 21/00 701/486 |
| 2015/0271208 | A1 * | 9/2015 | Gallant | H04L 63/20 726/1 |
| 2016/0068264 | A1 * | 3/2016 | Ganesh | G08G 5/0069 701/2 |

* cited by examiner

Primary Examiner — Tyler Paige
(74) Attorney, Agent, or Firm — Lindauer Law, PLLC

(57) ABSTRACT

Uncrewed autonomous vehicles ("UAVs") may navigate from one location to another location. Described herein are systems, devices, and methods providing countermeasures for threats that may compromise the UAVs. A plurality of UAVs may establish a mesh network to distribute information to one another. A first UAV may receive external data from a second UAV using the mesh network. The external data may be used to confirm or cross-check data such as location, heading, altitude, and so forth. Disagreement between data generated by the first UAV with external data from the second UAV may result in the determination that the first UAV is compromised. Remedial actions may be taken, such as the first UAV may be directed to a safe location to land or park, may receive commands from another UAV, and so forth.

20 Claims, 12 Drawing Sheets

COUNTERMEASURES FOR THREATS TO AN UNCREWED AUTONOMOUS VEHICLE

BACKGROUND

Uncrewed autonomous vehicles ("UAVs") may navigate from one location to another location. During navigation, the UAVs may be vulnerable to various threats. For example, an adversarial person may interfere with the wireless communications of a UAV using a wireless signal jammer. These threats may cause a variety of adverse effects including the UAV crashing.

Figure 1:
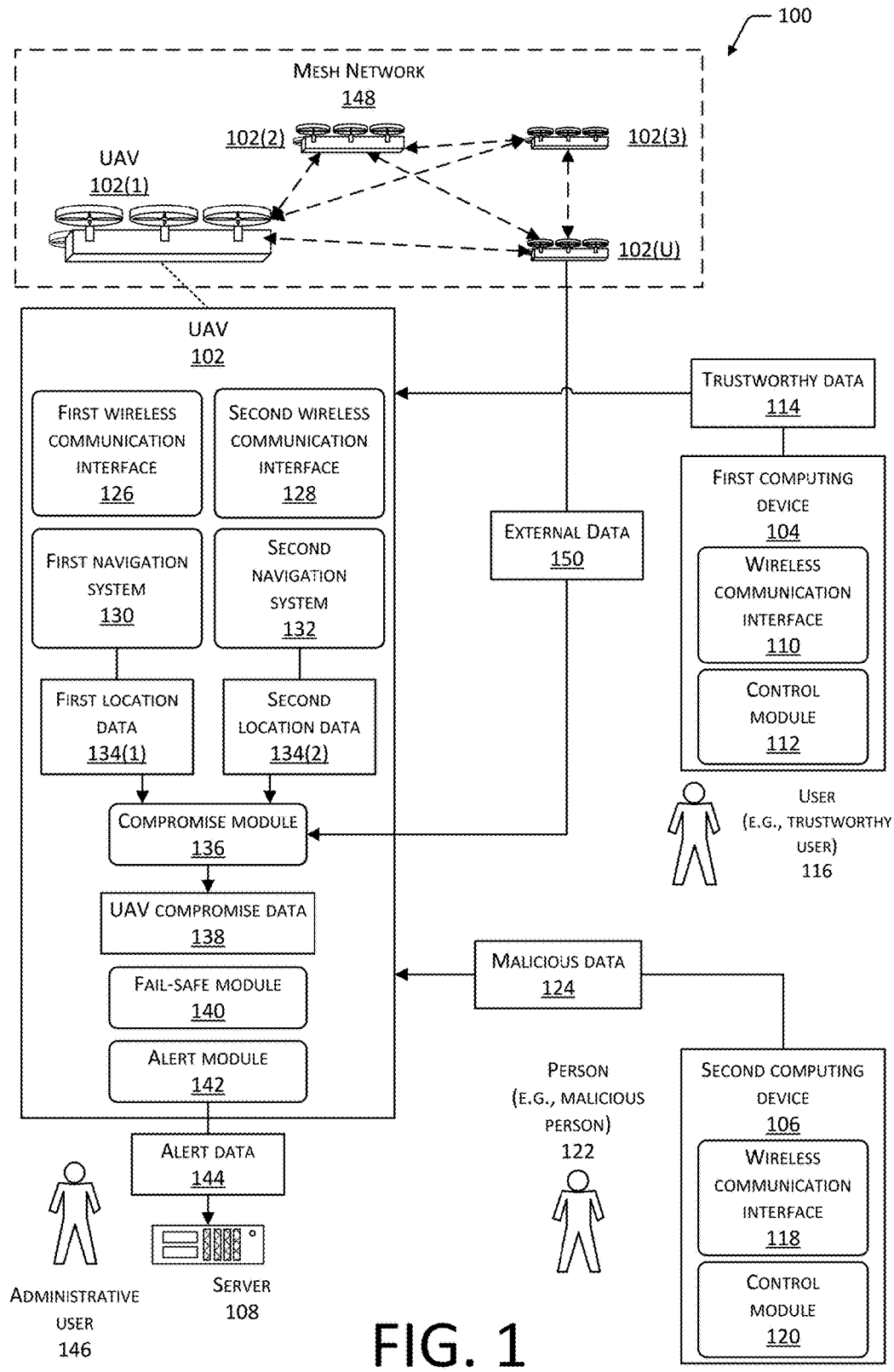
FIG. 1 is an illustrative system establishing different communication links between a UAV and a first computing device, determining that a threat which may compromise a UAV has occurred, and providing an alert of the threat to a server.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to systems, devices, and methods providing countermeasures for threats that may compromise an uncrewed autonomous vehicle ("UAV"). The UAV may comprise a mobile machine configured to operate in one or more autonomous or semi-autonomous modes. In a fully autonomous mode, the UAV may be configured to manage route selection, navigation, piloting, and so forth, without human intervention. In a semi-autonomous mode, some human intervention may be utilized. For example, in a semi-autonomous mode, a human operator may designate or approve a particular navigational route. The UAV may include an uncrewed ground vehicle, an uncrewed aerial vehicle, a drone, a remotely piloted aircraft, and so forth.

The UAV may be exposed to various threats that may compromise the UAV. A compromise takes place when operation of the UAV is tampered with, impaired, and so forth. For example, the UAV may be configured to transport packages from a distribution center to a residential home, business, and so forth. While the UAV navigates proximate to a destination computing device, the UAV may wirelessly communicate with one or more computing devices including the destination computing device. For example, authentication information may be transmitting between the UAV and the destination computing device. During navigation, an adversarial person, or other adversarial entity, may attempt to disrupt communications between the UAV and the destination computing device by using a computing device such as a wireless signal jammer. In another example, the adversarial person may use a weapon to inflict damage to the UAV. In yet another example, other signal sources may accidently cause interference between the data transfer between the UAV and the destination computing device. These threats may cause a variety of adverse effects including the UAV being redirected to an unintended location, destruction of the UAV, and so forth.

The UAV may perform a variety of operations. For example, the operation of the UAV may include navigating to a particular location. In another example, the operation of an aerial UAV may include providing a sufficient amount of energy to rotors to sustain flight. In yet another example, the operation of the UAV may include establishing a communication link with a particular computing device.

The UAV may include one or more systems. For example, the UAV may include a navigation system that directs the UAV from a first location to a second location. The UAV may include different navigation systems that determine the location of the UAV. In another example, the UAV may include a UAV wireless communication interface that is configured to establish a communication link with a computing device. The one or more systems of the UAV may be characterized, or their operation described, by way of one or more parameters.

Operation of the UAV may be compromised due to component failure, software failure, or external input such as from malicious actions or benign actions on the part of another. The UAV may determine operation is compromised when the UAV determines that one or more of the parameters are above a threshold value or other out-of-bound conditions occur. For example, the UAV may determine operation is compromised when indicated speed exceeds a maximum speed, or processor usage exceeds a maximum value.

In one example, the UAV may include a first system and a second system. The UAV may access a first parameter associated with the first system, and the UAV may access a second parameter associated with the second system. The UAV may compare the first parameter with the second parameter. The UAV may determine an operation of the UAV is compromised when the first parameter is different from the second parameter by a threshold value. In another example, the UAV may use the first parameter to form a third parameter, and the UAV may determine operation of the UAV is compromised when the second parameter is different from the third parameter by a threshold value.

A plurality of UAVs may communicate with one another. The communication may comprise a mesh network in which each UAV that participates may send, receive, or relay data such that data is distributed to designated recipient(s). In other implementations, other network topologies may be used, such as ring networks, star networks, tree networks, and so forth.

The location data discussed herein may be specified in terms of latitude, longitude, altitude, grid square, street address, position relative to navigational beacons or landmarks, and so forth. For example, the location of the UAV may be specified as 48.918 North, −119.446 West, altitude of 310 meters, 816 Juniper Street, radial 297 distance 15.4 kilometers from CWK VORTAC, Maidenhead Grid Square DN08gw, and so forth. In some implementations, the location data may include other information as well, such as heading, speed, and so forth.

The UAV may determine a compromise based on external data received from another UAV. For example, a first UAV may send a request to other UAVs via the mesh network, asking for confirmation of location data. The other UAVs may report their own location or may determine the location of the first UAV and provide that information back to the first UAV.

In another example, other UAVs may observe behavior of the first UAV that is unexpected or beyond a threshold value. The other UAVs may then send external data to the first UAV indicating a potential compromise. Continuing the example, a second UAV may determine that the altitude of first UAV is above a maximum cruise altitude or below a minimum cruise altitude threshold value.

Once operation is determined to be compromised, the UAV may perform one or more remedial actions to attempt to mitigate or correct the compromise. For example, the UAV may transmit alert data indicative of the compromised operation to a server that is associated with an administrative user. The administrative user may plan on how to solve any possible issues that may arise based on the occurrence of a threat that may compromise the UAV.

In another example, the first UAV that has been determined to be compromised may transmit the alert data to other UAVs in the mesh network. Continuing the example, responsive to the alert data, a second UAV may approach the first UAV and provide commands or other data to direct the first UAV to a safe landing, parking, docking, and so forth.

Directionality of signals received by the UAV may be used to determine a compromise or attempt to compromise the UAV. The UAV may incorporate directional antennas, optical detectors, and so forth, configured to provide information such as a direction, relative to the UAV, of a source of a signal. In some implementations, a plurality of antennas may be used in conjunction with other devices suitable for measuring Doppler frequency differences, phase differences, and so forth, to determine a direction of the signal. The UAV may access source data providing information about the source. An expected direction may be generated, indicating from what direction relative to the UAV the signal is expected to arrive from. Should the direction as received differ from the expected direction, a compromise may be determined. For example, signals from a satellite navigation system may be expected to come from an overhead direction. Receipt of satellite navigation signals from below an aerial UAV in flight may result in a determination of a compromise, such as resulting from malicious or inadvertent jamming from a terrestrial radio transmitter.

In another example, an adversarial person may interfere with the UAV such that the UAV begins to fall from the sky. The UAV may deploy a protective device such as an airbag, foam, parachute, bumper, and so forth, or the UAV may initiate a mode such as configuring autorotation of one or more rotors in response to the determination that the UAV is compromised. The protective device may be configured to absorb or reduce the kinetic energy released during impact between the UAV and another object. For example, foam may be deployed to cover at least a portion of one or more surfaces of the UAV. Other actions that the UAV may perform in response to an occurrence of a compromise are discussed below.

By determining that an operation of the UAV may be compromised, countermeasures may be provided. The countermeasures may reduce or eliminate ill-intentioned acts, inadvertent system failures, or mitigate the impact of such acts or failures. For example, theft of the UAVs or items carried by the UAVs due tampering may be reduced or eliminated. In another example, if a malicious person attempts to gain control of the UAV, the compromise may be detected, and the UAV may enter a fail-safe mode in which the UAV returns to base or lands on the ground. The countermeasures may reduce the adverse consequences associated with the compromise.

Illustrative System

FIG. 1 is an illustrative system 100 for establishing different communication links between a UAV and a first computing device, determining that a threat which may compromise the UAV has occurred, and providing an alert of the threat to a server. The system 100 includes a UAV 102, a first computing device 104, a second computing device 106, and a server 108. Although FIG. 1 depicts a single first computing device 104, second computing device 106, and server 108, in some implementations, the system 100 include one or more of each. As used in this disclosure, letters in parenthesis such as "(U)" indicate an integer value.

One or more networks (not shown) facilitate communication between the one or more UAVs 102, the one or more first computing devices 104, the one or more second computing devices 106, and the one or more servers 108. These networks may include a local network, a wide area network ("WAN"), broadcast network, a personal area network ("PAN"), a wired and wireless local area network ("LAN"), and so forth. In some implementations, the network includes at least one of Ethernet, Wi-Fi® as promulgated by the Wi-Fi Alliance, 3G and 4G, Bluetooth® as promulgated by the Bluetooth Special Interest Group, and so forth. In some implementations, the devices and systems described herein are configured to directly connect to each other. A plurality of UAVs 102 may establish a network between one another to exchange data. For example, as depicted here, the UAVs 102 may form a mesh network 148. External data 150 may be received from one or more of the plurality of UAVs 102 using the mesh network 148. The communication links between the UAVs 102 in the mesh network 148 may be encrypted. The communication links may also utilize particular modulation schemes such as frequency hopping, spread-spectrum, and so forth, to maintain security, reduce interference, and so forth. In other implementations, other network topologies may be used, such as ring networks, star networks, tree networks, and so forth.

The UAV 102 comprises a mobile machine able to operate in one or more autonomous or semi-autonomous modes. In a fully autonomous mode, the UAV 102 may be configured to manage, without human intervention, route selection, navigation, piloting, and so forth. In a semi-autonomous mode, some human intervention may be utilized. For example, in a semi-autonomous mode, a human operator may designate or approve a particular navigational route. The UAV 102 may be configured to transport one or more items such as a package for delivery. The UAV 102 may include an uncrewed ground vehicle, an uncrewed aerial vehicle, a drone, a remotely piloted aircraft, and so forth. In some implementations, the UAV 102 is configured to transport people.

The first computing device 104 may include at least one of a wireless beacon, a smartphone, a tablet computer, a laptop computer, a wearable computing device, an electronic book ("eBook") reader, an in-vehicle communication system, a desktop computer, a television, a gaming console, a server 108, and so forth. The first computing device 104 may include one or more communication interfaces. For example, the first computing device 104 may include a wireless communication interface 110. The wireless communication interface 110 may be configured to provide communications with the UAV 102, web-based resources, servers 108, routers, wireless access points, network access satellites, cellular towers, and so forth. The wireless communication interface 110 may include wireless functions, devices configured to couple to one or more networks including LANs, wireless LANs, WANs, wireless WANs, and so forth.

The first computing device 104 may include a control module 112 configured to manage various components, devices, or systems of the first computing device 104. The control module 112 may be configured to manage hardware resources such as an input/output ("I/O") interface (e.g., the wireless communication interface 110) or an I/O device. The control module 112 may provide various services to applications or modules executing on the first computing device 104.

The UAV 102 may navigate towards the first computing device 104 using information transmitted by the first computing device 104. The UAV 102 may use trustworthy data 114 transmitted by the first computing device 104 to navigate to the first computing device 104. In one example, the first computing device 104 comprises a wireless beacon. The wireless beacon periodically transmits trustworthy data 114 comprising information that includes at least one of the location of the wireless beacon or a unique identification of the wireless beacon. In FIG. 1, the first computing device 104 is associated with a user 116. The user 116 may be described as trustworthy because the user 116 may operate the first computing device 104 with good intentions such that harmless information that is not structured to cause harmful effects may be transmitted from the first computing device 104 to the UAV 102.

The second computing device 106 may include at least one of a wireless signal jammer, a wireless beacon, a smartphone, a tablet computer, a laptop computer, a wearable computing device, an eBook reader, an in-vehicle communication system, a desktop computer, a television, a gaming console, a server, and so forth. The second computing device 106 may include one or more communication interfaces. For example, the second computing device 106 may include a wireless communication interface 118. The wireless communication interface 118 may be configured to provide communications with the UAV 102, web-based resources, servers 108, routers, wireless access points, network access satellites, cellular towers, and so forth. The wireless communication interface 118 may include wireless functions, devices configured to couple to one or more networks including LANs, wireless LANs, WANs, wireless WANs, and so forth. The second computing device 106 may include a control module 120 configured to manage various components, devices, or systems of the second computing device 106. The control module 120 may be configured to manage hardware resources such as an I/O interface (e.g., the wireless communication interface 118) or an I/O device. The control module 120 may provide various services to applications or modules executing on the second computing device 106.

The second computing device 106 may be configured to cause a threat that may compromise the UAV 102. In FIG. 1, the second computing device 106 is associated with a person 122. In one example, the person 122 may be described as an adversarial person with ill-intentions seeking to exploit weaknesses in a computer system or computer network for personal gain. In another example, the person 122 may attempt to damage or capture the UAV 102 using a weapon such as a firearm or bow and arrow. In yet another example, the person 122 may be unaware that the second computing device 106 is causing a threat that may compromise the UAV 102. In this example, unknown to the person 122, an operational malfunction of or compromise of the software executing on the second computing device 106 may cause interfering signals from the second computing device 106 to compromise the UAV 102.

The second computing device 106 may transmit malicious data 124 to the UAV 102 using the wireless communication interface 118. For example, the second computing device 106 may be compromised by a virus, malware, Trojan horse, and so forth, configured to transmit the malicious data 124. In another example, the second computing device 106 comprises a wireless signal jammer, and the person 122 intends to use the wireless signal jammer to cause the UAV 102 to crash or otherwise manipulate its operation by interfering with the reception of data transmitted by the first computing device 104. The malicious data 124 may comprise malicious information or instructions structured to cause harmful effects, false data, and so forth. The harmful effects may include a disruption of computer operations, gathering sensitive information, gaining access to private computer systems, providing false input, and so forth. In one example, the malicious data 124 comprises malicious software ("malware"). The malware may include at least one of computer viruses, ransomware, worms, Trojan horses, keyloggers, adware, spyware, root kit, or other malicious programs. In some implementations, the malicious data 124 may be described as a computer contaminant. In another example, the malicious data 124 may comprise information that is improperly constructed such that harmful effects occur. In yet another example, the malicious data 124 may comprise false navigational data, such as when "spoofing" a navigational system.

The UAV 102 may include a first wireless communication interface 126 configured to establish a first wireless communication link with the first computing device 104. The first wireless communication interface 126 may establish the first communication link on a carrier frequency below 10 gigahertz ("GHz"). The first computing device 104 may provide data indicating an identification of the first computing device 104 or the location of the first computing device 104 using the first communication link. As discussed in more detail below with regard to FIG. 2, heartbeat data may be transmitted between the UAV 102 and the first computing device 104. The heartbeat data may be used to verify that the first communication link is established between the UAV 102 and the first computing device 104 over a period of time.

The UAV 102 may include a second wireless communication interface 128 configured to establish a second wireless communication link with the first computing device 104 or with another UAV 102 that is close by. The second wireless communication interface 128 may establish the second wireless communication link on a carrier frequency above 60 GHz with a bandwidth that is equal to or greater than 100 megahertz ("MHz").

The first computing device 104 may provide data indicating an identification of the first computing device 104 or the location of the first computing device 104 using the second wireless communication link. The heartbeat data may be transmitted between the UAV 102 and the first computing device 104 using the second wireless communication link. To increase resistance to interference and signal jamming, the second wireless communication link may be executed using one or more of spread spectrum or frequency hopping.

In another implementation, the first UAV 102(1) may receive commands from another UAV 102(2) by way of the second wireless communication interface 128. For example, upon determination of a compromise of the first UAV 102(1), the second UAV 102(2) may take control over the first UAV 102(1) and guide it to a predetermined location, such as a safe landing zone.

The UAV 102 may include a first navigation system 130 and a different, second navigation system 132. At least one of the first navigation system 130 or the second navigation system 132 may include an inertial navigation system, dead-reckoning navigation system, network positioning system, radio position finding system, satellite-based navigation system, cellular tower-based locating systems, an accelerometer system, a gyroscope system, altimeters, speed-measuring devices, odometers, compasses, and so forth. The satellite-based navigation system may include one or more of a Global Positioning System ("GPS") receiver, a global navigation satellite system ("GLONASS") receiver, a Galileo receiver, an Indian Regional Navigational Satellite System, and so forth.

In FIG. 1, the first navigation system 130 generates first location data 134(1) indicative of a first location of the UAV 102, and the second navigation system 132 generates second location data 134(2) indicative of a second location of the UAV 102. The location data 134(1) and 134(2) may include any suitable data indicative of a location. The location may be specified in terms of latitude, longitude, altitude, grid square, street address, position relative to navigational beacons or landmarks, and so forth. For example, the location of the UAV 102 may be specified as 48.918 North, −119.446 West, altitude of 310 meters, 816 Juniper Street, radial 297 distance 15.4 kilometers from CWK VORTAC, Maidenhead Grid Square DN08gw, and so forth.

The UAV 102 may include a compromise module 136 configured to generate UAV compromise data 138. The UAV compromise data 138 may indicate a determination that a threat which may compromise the UAV 102 has occurred. The UAV compromise data 138 may indicate the occurrence of an actual compromise, or the UAV compromise data 138 may provide information indicative of a possible occurrence of a compromise. In FIG. 1, the compromise module 136 compares the first location data 134(1) with the second location data 134(2) and determines operation of the UAV 102 is compromised. In this example, the operation of the UAV 102 includes determining the location of the UAV 102. The UAV 102 may navigate proximate to the first computing device 104 using the location of the UAV 102. The compromise module 136 may generate the UAV compromise data 138 because the location indicated by the first location data 134(1) is different from the location indicated by the second location data 134(2) by a threshold value.

The compromise module 136 may be configured to accept input from different systems, redundant systems, or external systems such as other UAVs 102 in the mesh network 148. For example, the compromise module 136 may receive external data 150 from other UAVs 102 in the mesh network 148.

The input used by the compromise module 136 may be compared in a "voting" scheme. For example, a third navigation system onboard another UAV 102(3) may be present that generates third location data 134(3) indicative of the location of the first UAV 102(1) as observed by the third UAV 102(3). The compromise module 136 may compare the first location data 134(1), the second location data 134(2), and the third location data 134(3), assigning a "vote" or value to the location indicated by each. The compromise module 136 may disregard the location data 134 that provides a result outside of a boundary condition with the remaining two "votes". For example, if the first location data 134(1) indicates a location in the vicinity of Austin, Tex., the second location data 134(2) indicates a location in the vicinity of Houston, Tex., and the third location data 134(3) also indicates a location of Austin, Tex., the second location data 134(2) may be "outvoted" and disregarded.

The UAV 102 may include a fail-safe module 140. The fail-safe module 140 may be configured to minimize harm or potential harm that may be caused to or by the UAV 102. The fail-safe module 140 may be configured to perform one or more actions in response to the generation of the UAV compromise data 138. In one example, the fail-safe module 140 terminates the navigation of the UAV 102 to a previously assigned destination, such as the first computing device 104.

In some implementations, the fail-safe module 140 causes the UAV 102 to land on the ground, park, dock, or otherwise assume a safe situation in response to the generation of the UAV compromise data 138. For example, the fail-safe module 140 may transition the UAV 102 to a fail-safe mode in which only a limited set of sensors are used and programming is limited to landing the UAV 102.

The fail-safe module 140 may be configured to direct the UAV 102, where possible, to a safe location. The safe location may be a predetermined area such as a facility at which the UAV 102 is based, has designated landing or parking areas, and so forth. For example, prior to deployment of the UAV 102, data indicative of the safe locations may be stored by the UAV 102 for subsequent use, should the need arise.

In some implementations, the fail-safe module 140 may determine safe locations based on criteria. For example, the criteria may be such that a safe location is designated as a relatively flat area determined to be free of people, vehicles, homes, and so forth. In some implementations, the UAV 102 may store, or be provided with information indicative of the safe location, such as by other UAVs 102 in the mesh network 148. In yet another example, the fail-safe module 140 may cause the UAV 102 to backtrack along a previously traveled route, return to a predetermined location such as a base, proceed to the destination location and then shutdown, and so forth.

In another example, the fail-safe module 140 may instruct the compromised UAV 102(1) to hold one or more of a particular location, or altitude until one or more other UAVs 102(U) arrive or are able to provide additional information about the compromised UAV 102(1). For example, upon detecting a potential compromise, the compromised UAV 102(1) may hover over a safe location until another UAV 102(2) arrives to provide commands to guide the compromised UAV 102(1) to another destination, such as a safe landing.

The fail-safe module 140 may comprise dedicated hardware such as a separate processor, memory, I/O devices, and so forth. In other implementations, the fail-safe module 140 may be executed at least in part with a secured environment, such as the Intel Trusted Execution Technology from Intel Corporation, the TrustZone Technology as promulgated by ARM Holdings, and so forth.

The UAV 102 may include an alert module 142 configured to generate alert data 144. The alert data 144 may comprise information indicating an occurrence of the compromise module 136 generating the UAV compromise data 138. In one example, the alert module 142 is configured to activate a strobe light configured to produce flashes of light which may be used by an administrative user 146 or another UAV 102 to find the UAV 102 that has landed. In another example, the alert module 142 is configured to emit a high-volume sound. For example, a siren sound or warning announcement may be audibly broadcast by speakers onboard the UAV 102 while the UAV 102 is landing or parking.

The alert data 144 may be sent to one or more of the UAVs 102 in the mesh network 148. The UAVs 102 in the mesh network 148 may relay the alert data 144 to the server 108. In some implementations, one or more of the other UAVs 102 may take action. For example, where the compromised UAV 102(1) has issued alert data 144, the second UAV 102(2) may travel proximate to the compromised UAV 102(1) and maintain surveillance on the compromised UAV 102(1). Other UAVs 102(3), 102(4), . . . , 102(U) may join in the surveillance, supplementing or replacing the second UAV 102(2). Continuing the example, several UAVs 102 may trade out the role of watching over the compromised UAV 102(1) to a fresh UAV 102 as each runs low on battery power.

In another implementation, distribution of the alert data 144 may result in other UAVs 102 having a route proximate to the location of the compromised UAV 102(1) may be redirected. While these UAVs 102 may not loiter near the compromised UAV 102(1), they may pass by, gathering surveillance data as to the disposition of the compromised UAV 102(1). For example, the first UAV 102(1) may be compromised and may land in a safe location, such as an empty parking lot. Other UAVs 102(2)-(7) having routes carrying them near the empty parking lot may change their routing, such that they overfly the empty parking lot. During their overflight, the other UAVs 102(2)-(7) may acquire surveillance data, such as imagery of the first UAV 102(1) in the empty parking lot, telemetry from the first UAV 102(1), and so forth.

In some implementations, the administrative user 146 may plan on how to solve any possible issues that may arise because of the threat that may compromise the UAV 102. For example, the administrative user 146 may plan to retrieve the UAV 102 or contact the user 116 to inform the user 116 of the occurrence of the threat.

In some implementations, a plurality of UAVs 102 may operate collaboratively. For example, UAVs 102 within communication range of one another using one or more of the first wireless communication interface 126 or the second wireless communication interface 128 may be configured to establish the mesh network 148 and exchange information such as current location data 134, a bearing of the neighboring UAV 102 as determined by another sensor, and so forth. By comparing the information from neighboring UAVs 102, the compromise module 136 may determine a compromise to one or more of the UAVs 102 has occurred.

Figure 2:
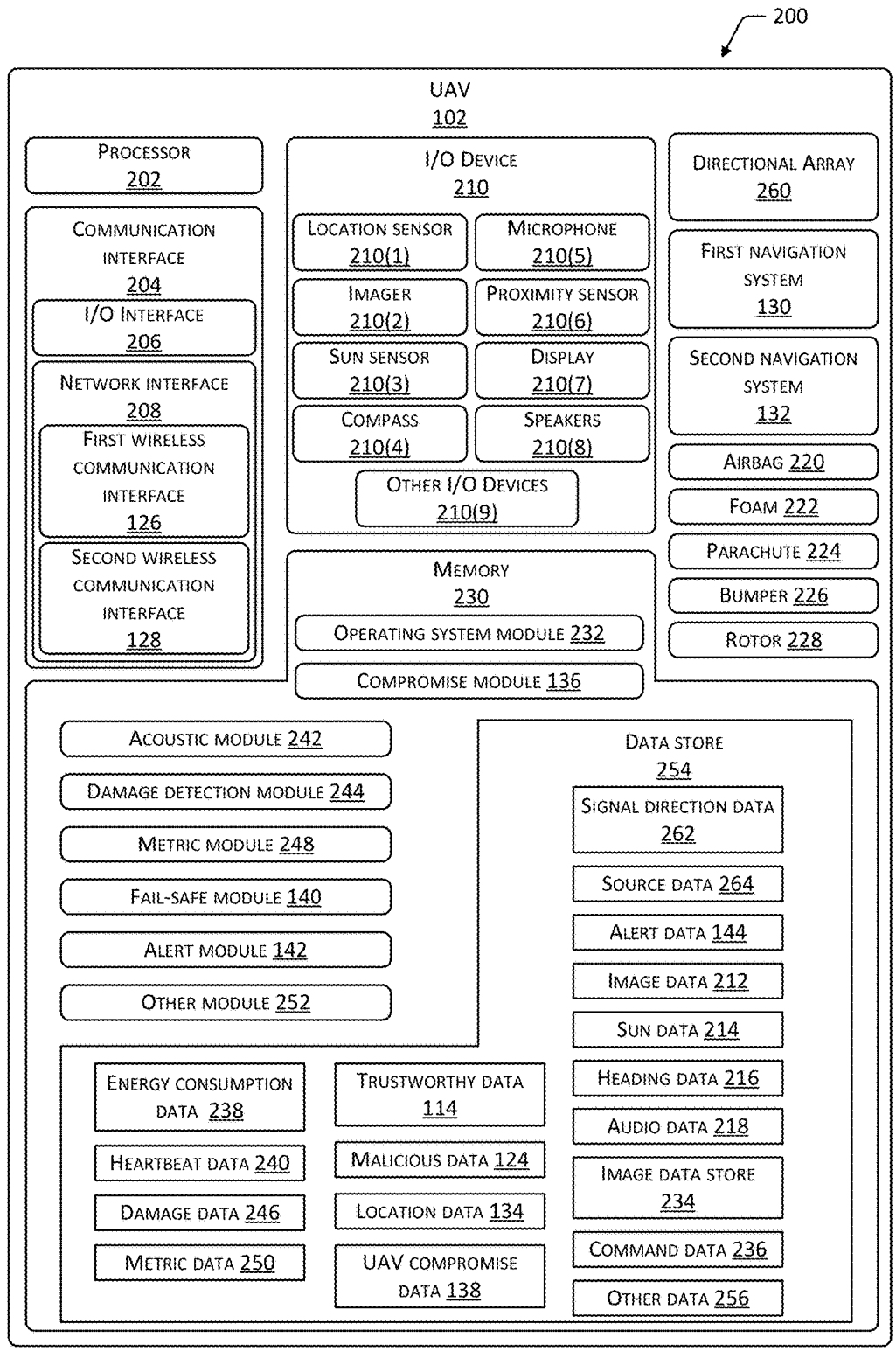
FIG. 2 is a block diagram of the UAV configured to determine that a threat which may compromise the UAV has occurred. The UAV is configured to perform actions to mitigate potential adverse effects resulting from the compromise.

FIG. 2 is a block diagram 200 of the UAV 102 configured to determine that a threat which may compromise the UAV 102 has occurred and perform different actions to mitigate potential adverse effects that would result from the compromise. The UAV 102 may include a power supply (not shown) configured to provide power to various components of the UAV 102. The power supply may utilize one or more of electric, chemical, or mechanical devices to store energy for operation of the UAV 102. In one example, the power supply may include a portable power supply, such as a disposable or rechargeable battery or battery pack. In some implementations, the power supply may include one or more sensors, such as voltmeters, ammeters, temperature sensors, and so forth. For example, a temperature sensor may be used to provide information about a temperature of a battery. The compromise module 136 may be configured to determine a compromise, such as a runaway exothermic reaction within the battery cell, based at least in part on the temperature of the temperature sensor.

The UAV 102 may include at least one hardware processor 202 (or "processor") configured to execute stored instructions. The at least one processor 202 may comprise one or more cores.

The UAV 102 may include a clock (not shown) such as a circuit that produces a timing signal (or clock signal) used to synchronize operations of the UAV 102. The clock may include a resonant circuit (e.g., a quartz piezoelectric oscillator) and amplifier.

The UAV 102 may also include one or more busses or other internal communications hardware or software (not shown) that allow for the transfer of data between the various modules and components of the UAV 102.

The UAV 102 may include one or more communication interfaces 204. The communications interface 204 may include one or more input/output ("I/O") interfaces 206 that enable portions of the UAV 102 (e.g., the processor 202) to communicate with other devices. The I/O interface 206 may be configured to implement various protocols, such as Inter-Integrated Circuit ("I2C"), Serial Peripheral Interface bus ("SPI"), Universal Serial Bus ("USB"), RS-232, HDMI, TOSLINK®, Bluetooth®, and so forth.

The communications interface 204 may include one or more network interfaces 208. The network interface 208 may be configured to provide communications with other UAVs 102, the first computing device 104, the second computing device 106, web-based resources, servers 108, routers, wireless access points, network access satellites, cellular towers, and so forth. The network interface 208 may include wireless functions and devices configured to couple to one or more networks including LANs, wireless LANs, WANs, wireless WANs, and so forth.

The network interface 208 may include the first wireless communication interface 126. The first wireless communication interface 126 may be configured to establish a first wireless communication link with the first computing device 104 or another UAV 102. The first wireless communication interface 126 may establish the first communication link on a carrier frequency below 10 GHz. For example, the first computing device 104 may provide data indicating an identification of the first computing device 104 or the location of the first computing device 104 using the first communication link. The first wireless communication link may use a cellular wireless network, licensed dedicated frequencies associated with operation of the UAVs 102, and so forth.

The first wireless communication interface 126 may be configured to provide communications with other UAVs 102, the first computing device 104, the second computing device 106, web-based resources, servers 108, routers, wireless access points, network access satellites, cellular towers, and so forth. The first wireless communication interface 126 may include wireless functions, devices configured to couple to one or more networks including wireless LANs, wireless WANs, and so forth.

The network interface 208 may include the second wireless communication interface 128. The second wireless communication interface 128 may be configured to establish a second wireless communication link with one or more of the first computing device 104 or other UAVs 102. The second wireless communication interface 128 may establish the second wireless communication link on a carrier frequency above 60 GHz with a bandwidth that is equal to or greater than 100 MHz. For example, the first computing device 104 or another UAV 102 may use the second wireless communication link to provide data indicating one or more of an identification of the first computing device 104 or another UAV 102, the location of the first computing device 104 or another UAV 102, and so forth.

To increase resistance to interference and signal jamming, the second wireless communication link may be executed using one or more of spread spectrum, frequency hopping, or other techniques. The second wireless communication interface 128 may be configured to provide communications with other UAVs 102, the first computing device 104, the second computing device 106, web-based resources, servers 108, routers, wireless access points, network access satellites, cellular towers, and so forth. The second wireless communication interface 128 may include wireless functions, devices configured to couple to one or more networks including wireless LANs, wireless WANs, and so forth.

In some implementations, the first wireless communication interface 126, the second wireless communication interface 128, or both may include a directional antenna or array of antennas. The compromise module 136 may be configured to acquire and provide information about the location data 134 of neighboring UAVs 102. This information, combined with directional information as to the source of a received signal, may be used to determine a compromise. For example, a first UAV 102(1) and a second UAV 102(2) may be travelling together. The first UAV 102(1) may report first location data 134(1) indicative of a first set of coordinates, and the second UAV 102(2) may report second location data 134(2) indicative of a second set of coordinates. The first set of coordinates may be to the left of the second set of coordinates. The directional data from the wireless communication interface of the first UAV 102(1) may indicate that signals from the second UAV 102(2) are being received from somewhere to the left of the first UAV 102(1), instead of somewhere to the right as expected from the coordinates. As a result, a compromise may be determined based on this discrepancy. In another example, satellite navigation signals received from below the UAV 102 while in flight may indicate a compromise.

The I/O interface 206 may couple to one or more I/O devices 210. The I/O devices 210 may include one or more input devices such as a keyboard, a touch sensor, a digital camera, user input buttons, and so forth.

The I/O device 210 may include one or more sensors (not shown) that may comprise one or more devices that detect or measures certain properties. The sensor may record, indicate, or otherwise respond to the detection of a certain property. The sensor may include a location sensor 210(1) configured to generate information about the location of the UAV 102. The information about the location of the UAV 102 may comprise the location data 134. The location data 134 may include geolocation data which is indicative of a latitude and longitude, and in some implementations, altitude of the UAV 102. The location data 134 may be specified in terms of grid square, street address, position relative to navigational beacons or landmarks, and so forth. For example, the location of the UAV 102 may be specified as 48.918 North, −119.446 West, 310 meters, 816 Juniper Street, radial 297 distance 15.4 kilometers from CWK VORTAC, Maidenhead Grid Square DN08gw, and so forth. The location sensor 210(1) may determine the location of the UAV 102 using at least one of the first navigation system 130 or the second navigation system 132.

The sensors may include an imager 210(2) (e.g., a camera). The imager 210(2) may detect objects, which may allow the UAV 102 to identify the objects. There could also be different imagers 210(2) oriented in different directions (left, right, and rear views) or a lens system that captures views in multiple directions, all of which are captured by the same imager 210(2). The imager 210(2) may be configured to acquire image data 212 (e.g., photographs), video data, or a combination thereof. The imager 210(2) may include any device configured to acquire image data 212.

The sensors may include a sun sensor 210(3). The sun sensor 210(3) may be configured to generate sun data 214 indicative of a position of the sun relative to at least one of the sun sensor 210(3) or the UAV 102. As discussed in more detail below, the compromise module 136 may use the sun data 214 to determine whether a threat that may compromise the UAV 102 has occurred. The sun data 214 may be compared with information such as from a celestial almanac, navigational tables, and so forth, to determine information such as latitude or longitude, estimate time of date, and so forth.

The sensors may include a compass 210(4) that indicates direction in a frame of reference that is stationary to the surface of earth. In one example, the compass 210(4) generates heading data 216 that indicates a direction towards which the UAV 102 is moving. For example, the heading data 216 may indicate that the UAV 102 is travelling northeast. The compass 210(4) may include at least one of a magnetometer or a gyrocompass.

The sensors may include a microphone 210(5) to acquire audio data 218 about the surrounding environment of the UAV 102. The audio data 218 may indicate that a projectile (e.g., an arrow or a bullet) has been discharged from a weapon. As discussed in more detail below, the compromise module 136 may use the audio data 218 to determine whether a threat that may harm the UAV 102 has occurred.

In yet another example, the sensors may include a proximity sensor 210(6) configured to generate presence data indicative of a presence of an object proximate to the UAV 102. For example, the proximity sensor 210(6) may detect another UAV 102, a projectile (e.g., an arrow or a bullet) from a weapon, the earth, and so forth. The proximity sensor 210(6) may include optical proximity sensors, capacitive proximity sensors, acoustic proximity sensors, near field communication ("NFC") tag readers, radio frequency identification ("RFID") tag readers, and so forth. For example, the RFID tag readers may generate proximity data based on detection and strength of a radio signal received from an RFID tag. The proximity sensors 210(6) may generate the presence data by using remote sensing technologies such as lidar, radar, sonar, and so forth.

The I/O devices 210 may also include output devices such as one or more displays 210(7), speakers 210(8), haptic output devices, and so forth. The I/O device 210 may include other I/O devices 210(9). For example, the other I/O devices 210(9) may include at least one of an accelerometer or a gyroscope that is configured to generate movement data representing movement of the UAV 102. In some implementations, the gyroscope may be configured to generate information about vibrations of the UAV 102. In another example, the other I/O device 210(9) includes a magnetometer configured to measure the strength and the direction of magnetic fields. Other I/O devices 210(9) may include a temperature sensor, a vibration sensor, an altimeter, a pitot tube, and so forth. The I/O devices 210 may be physically incorporated within the UAV 102, or the I/O devices 210 may be externally placed. The I/O devices 210 may include various other devices (not shown) as well.

A directional array 260 is configured to determine a direction of a signal. The signal may be associated with a communication interface, navigation system, and so forth. For example, where the signal comprises a radio frequency (RF) signal, the directional array 260 may comprise one or more antennas exhibiting gain or directivity in one or more predetermined directions. Continuing the example, the directional array 260 may comprise a plurality of microwave horn antennas, each mounted to provide gain in a different direction. In another example, the directional array 260 may comprise a plurality of omnidirectional antennas. In yet another example, where the signal comprises an optical signal such as infrared, visible, or ultraviolet light, the directional array 260 may comprise a set of optical detectors having baffles, lenses, or other structures to accept light from a particular direction.

The directional array 260 may be configured to generate signal direction data 262. For example, an array of a plurality of omnidirectional antennas may use a comparison of Doppler or phase differences in the signals received at the antennas to determine a direction. The signal direction data 262 comprises information indicative of the direction from which a signal was received by the directional array 260. The signal direction data 262 may indicate an absolute direction (such as a compass heading) or a relative direction (such as a bearing) relative to the UAV 102 to which the directional array 260 is affixed.

The compromise module 136 may be configured to access source data 264. The source data 264 comprises information indicative of an expected location of a source of the signal received by the directional array 260. The source data 264 may vary based on the type of source, mode in which the UAV 102 is operating, and so forth. In one implementation, the source data 264 for a satellite-based source, such as a navigational satellite, may be based on almanac data received from a satellite navigation system, ephemeris data received from the satellite navigation system, and so forth. Continuing the example, the source data 264 associated with the GPS navigational satellites may be the ephemeris data and almanac data transmitted by the satellites.

In another implementation, the source data 264 may comprise coordinates indicative of a location of the source when the source is fixed. For example, the latitude, longitude, and altitude of a fixed terrestrial broadcast transmitter may be stored.

In another implementation, the source data 264 may be relatively coarse. For example, the source data 264 may provide relative position data indicating that the source is expected to be above or below, in front or behind, and so forth, relative to the UAV 102. The relative position data indicates the expected direction of the signal relative to the UAV 102, and may be independent of the exact location of the UAV 102.

The UAV 102 may include the first navigation system 130 and the second navigation system 132. At least one of the first navigation system 130 or the second navigation system 132 may include an inertial navigation system, dead-reckoning navigation system, network positioning system, radio position finding system, satellite-based navigation system, cellular tower-based locating systems, an accelerometer system, a gyroscope system, tilt sensor, odometers, compasses, accelerometers, and so forth. The satellite-based navigation system may include one or more of a GPS receiver, a GLONASS receiver, a Galileo receiver, an Indian Regional Navigational Satellite System, and so forth.

The UAV 102 may include one or more protective devices or modes configured to absorb or reduce the kinetic energy released during an impact between the UAV and another object. As discussed in more detail below, the fail-safe module 140 may deploy the protective devices or modes in response to a determination that a compromise to the UAV 102 has occurred.

The protective devices may include an airbag 220, foam 222, a parachute 224, a bumper 226, a rotor 228, and so forth. The airbag 220 may be configured to inflate and absorb kinetic energy released during an impact between the UAV 102 and another object.

The foam 222 may be configured to be deployed in response to a determination that a compromise to the UAV 102 has occurred. The foam 222 may be designed to coat or cover at least a portion of one or more surfaces of the UAV 102.

The parachute 224 may be aerodynamically or ballistically deployed. For example, a person 122 may shoot the UAV 102 with a weapon, such as a gun, causing the UAV 102 to fall towards Earth. The compromise module 136 may detect the gunshot and loss of altitude, and the fail-safe module 140 may cause the parachute 224 to deploy, which may reduce the severity of the impact between the UAV 102 and another object, such as the ground.

The bumper 226 may comprise one or more structures configured to deform or crush upon impact to absorb kinetic energy released during an impact. For example, the bumper 226 may comprise a set of crushable pylons configured to be deployed beneath the UAV 102.

The UAV 102 may include one or more rotors 228 configured to generate aerodynamic lift force that supports the weight of the UAV 102 and thrust that counteracts the aerodynamic drag in forward flight. In some implementations, the rotors 228 may be operated in an autorotation or drag mode. For example, in the autorotation mode, the rotors 228 may not be producing lift, but may retard a fall of the UAV 102 or allow for some lateral control of the UAV 102. As discussed in more detail below, the compromise module 136 may use the amount of energy consumed by the rotors 228 to determine whether a compromise to the UAV 102 has occurred.

As illustrated in FIG. 2, the UAV 102 may include at least one memory 230 or memory device. The memory 230 may include at least one non-transitory computer-readable storage media ("CRSM"). The CRSM may include at least one of an electronic storage medium, a magnetic storage medium, an optical storage medium, a quantum storage medium, a mechanical computer storage medium, and so forth. The memory 230 may include computer readable instructions, data structures, program modules, and other data for the operation of the UAV 102.

The memory 230 may include at least one operating system ("OS") module 232. The OS module 232 may be configured to manage hardware resources such as the communication interface 204, the I/O devices 210, and provide various services to applications or modules executing on the processor 202. The memory 230 may also store at least one of the following modules that may be executed as foreground applications, background tasks, daemons, and so forth.

The memory 230 may include the compromise module 136 configured to generate the UAV compromise data 138 indicative of a determination that a threat which may compromise the UAV 102 has occurred. Generating the UAV compromise data 138 may comprise determining one or more operations of the UAV 102 are compromised. The generation of the UAV compromise data 138 may be based on a variety of different systems and determinations. For example, the compromise module 136 may generate the UAV compromise data 138 based on different locations associated with the UAV 102 being different by a threshold value. The compromise module 136 may compare the first location data 134(1) with the second location data 134(2) and determine that a distance between the locations indicated by the first location data 134(1) and the second location data 134(2) are greater than a threshold distance.

In another example, the compromise module 136 may generate the UAV compromise data 138 based on the heading data 216. For example, the first navigation system 130 may generate first heading data 216 using a satellite-based navigation system. The first heading data 216 may indicate a first direction towards which the UAV 102 is moving. The second navigation system 132 may generate second heading data 216 using the compass 210(4). The second heading data 216 may indicate a second direction towards which the UAV 102 is moving. The compromise module 136 may compare the first heading data 216 with the second heading data 216, and the compromise module 136 may determine that the first direction is different from the second direction by a threshold value. As a result, the compromise module 136 may generate the UAV compromise data 138.

The compromise module 136 may generate the UAV compromise data 138 based on the image data 212. For example, while the UAV 102 navigates to the first computing device 104, the imager 210(2) may acquire the image data 212 that includes data representing objects (e.g., a mountain, a road, a building, and so on) in the surrounding environment. The compromise module 136 may access an image data store 234 that includes data representing one or more objects that are expected to be depicted in the acquired image data 212. The compromise module 136 may compare the image data 212 acquired from the imager 210(2) with the data from the image data store 234 and determine that one or more objects are missing from the acquired image data 212. In another example, the compromise module 136 may compare the image data 212 acquired from the imager 210(2) with the data from the image data store 234 and determine that one or more unexpected objects are included. In response, the compromise module 136 may generate the UAV compromise data 138. In another example, based on the trajectory and location of the UAV 102, the compromise module 136 may expect that an object (e.g., the sun, a bridge, and so on) should be depicted in the acquired image data 212. In this example, if the compromise module 136 determines that the acquired image data 212 does not include the expected objects, the compromise module 136 may generate the UAV compromise data 138.

The image data 212 may also include information about visible occurrences in the environment around the UAV 102. For example, the image data 212 may include images of lightning, muzzle flashes, and so forth. The compromise module 136 may be configured to generate UAV compromise data 138 indicative of these events. For example, the compromise module 136 may determine that lightning or muzzle flashes are proximate to the UAV 102.

The compromise module 136 may generate the UAV compromise data 138 based on a parameter exceeding a threshold level. For example, an airspeed measuring device may transition from reading 10 m/s to 300 m/s within 500 milliseconds. The UAV 102 may be unable to accelerate that quickly, and so this transition may result in generation of the UAV compromise data 138.

The compromise module 136 may generate the UAV compromise data 138 based on a change in the direction in which data is received. For example, the compromise module 136 may receive first command data 236 from the first computing device 104. The first command data 236 may comprise data indicative of a request for the UAV 102 to perform a process. The compromise module 136 may determine a first direction relative to the UAV 102 in which the first command data 236 was received. The compromise module 136 may receive second command data 236 from the second computing device 106. The compromise module 136 determines that the second command data 236 was received from a second, different direction relative to the UAV 102. The compromise module 136 determines that the first direction is different from the second, different direction by a threshold value. In response, the compromise module 136 generates the UAV compromise data 138.

The command data 236 may comprise one or more instructions configured to elicit a particular response from one or more devices or systems onboard the UAV 102. For example, the command data 236 may comprise location data 134 such as latitude, longitude, altitude, airspeed, heading, and so forth. In another example, the command data 236 may comprise particular instructions to turn left, turn right, increase altitude, decrease altitude, increase speed, decrease speed, and so forth.

The compromise module 136 may generate the UAV compromise data 138 based on energy consumption of one or more systems or devices of the UAV 102. For example, the compromise module 136 may generate energy consumption data 238 indicative of an amount of energy consumed by the one or more rotors 228. The compromise module 136 may generate the UAV compromise data 138 in response to a determination that the amount of energy consumed by the one or more rotors 228 is greater than or equal to a threshold value. In another example, the compromise module 136 may access data indicative of previous amounts of energy consumed by the one or more rotors 228. The compromise module 136 may compare the current energy consumption amount of the rotors 228 with the previous amounts of energy consumed by the rotors 228 and determine that the difference between the current energy consumption and the previous energy consumption is greater than or equal to a threshold amount. As a result, the compromise module 136 may generate the UAV compromise data 138.

The compromise module 136 may generate the UAV compromise data 138 based on heartbeat data 240. The heartbeat data 240 may comprise periodic signals generated at regular time intervals. The first computing device 104 may provide the heartbeat data 240 to the UAV 102 over a period of time. The UAV 102 may use the heartbeat data 240 to confirm that a communication link is established between the UAV 102 and the first computing device 104. The compromise module 136 may generate the UAV compromise data 138 if the compromise module 136 expects to but does not receive the heartbeat data 240 from the first computing device 104. The heartbeat data 240 may be provided between the network interface 208 of the UAV 102 and the wireless communication interface 110 of the first computing device 104 using an encrypted data stream.

In some implementations, UAVs 102 within the mesh network 148 may provide heartbeat data 240 to one another. For example, the first UAV 102(1) may receive heartbeat data 240 from the UAVs 102(2), 102(3), and 102(4) that are in range, or within a threshold number of hops within the mesh network 148. As UAVs 102 move about their respective routes, they may move closer or farther apart, coming into or out of range of one another. However, changes to heartbeat data 240 in a short span of time may indicate compromise. For example, should the first UAV 102(1) no longer be receiving heartbeat data 240 from the UAVs 102(2)-(4), this may be indicative of compromise in the form of jamming of the receiver of the first UAV 102(1), failure of a communication interface, and so forth.

The compromise module 136 may generate the UAV compromise data 138 based on sun data 214 that is indicative of the position of the sun relative to at least one of the sun sensor 210(3) or the UAV 102. For example, while the UAV 102 navigates to the first computing device 104, the sun sensor 210(3) may generate first sun data 214 indicating a first position of the sun relative to the sun sensor 210(3). The compromise module 136 may generate second sun data 214 indicating a second position of the sun relative to the sun sensor 210(3) based on the location data 134 of the UAV 102. For example, based on the trajectory and location of the UAV 102, the compromise module 136 may determine the second sun data 214 by looking up information about the position of the sun stored within a data store that includes information about the position of the sun relative to the location and the trajectory of the UAV 102. The compromise module 136 may compare the first sun data 214 with the second sun data 214 and may generate the UAV compromise data 138 in response to a determination that the first position of the sun is different than the second position of the sun by a threshold value.

The compromise module 136 may generate the UAV compromise data 138 based on the establishment of one or more communication links between the UAV 102 and another computing device. For example, the UAV 102 may be configured to establish a first wireless communication link with the first computing device 104. The first wireless communication link may have a first operational range equal to or greater than 100 meters. The UAV 102 may also be configured to establish a second wireless communication link with the first computing device 104 when the UAV 102 is proximate to the first computing device 104. In this example, the UAV 102 is proximate to the first computing device 104 when the UAV 102 is located less than 100 meters from the first computing device 104. The compromise module 136 may determine one or more operations of the UAV 102 are compromised in response to a determination that the second wireless communication link has been established when the first computing device 104 is located greater than 100 meters from the UAV 102.

The memory 230 may include an acoustic module 242 configured to generate the audio data 218 that includes information about the surrounding environment of the UAV 102. In one example, the acoustic module 242 uses the microphone 210(5) to capture audio from the surrounding environment of the UAV 102. The acoustic module 242 may analyze the audio data 218 to determine whether the captured audio data 218 is associated with one or more predetermined actions. For example, the acoustic module 242 may analyze the audio data 218 to determine that a gunshot has occurred from the surrounding environment of the UAV 102. The compromise module 136 may include the acoustic module 242 or operate with the acoustic module 242 to determine whether a threat that may compromise the UAV 102 has occurred. For example, in response to the audio data 218 indicating a gunshot has occurred, the compromise module 136 may generate the UAV compromise data 138.

The memory 230 may include a damage detection module 244 configured to generate damage data 246 indicative of a determination that one or more devices or systems of the UAV 102 has been damaged. For example, the damage data 246 may indicate that one or more of the rotors 228 of the UAV 102 have failed. In one implementation, this determination may be due to one or more of a change in onboard vibrations as detected by a vibration detector, unexpected decrease in power consumption by the rotor 228.

The compromise module 136 may include the damage detection module 244 or operate with the damage detection module 244 to determine whether or not a threat that may compromise the UAV 102 has occurred. For example, in response to the damage data 246 indicating that one or more devices or systems of the UAV 102 has failed, the compromise module 136 may generate the UAV compromise data 138. In yet another example, the compromise module 136 may generate the UAV compromise data 138 in response to a determination that the damage data 246 was generated within a threshold period of time from the generation of the audio data 218 indicating that one or more predetermined actions (e.g., a gunshot) has occurred.

The memory 230 may include a metric module 248 configured to generate metric data 250. The compromise module 136 may include the metric module 248 or operate with the metric module 248 to determine whether or not a threat that may compromise the UAV 102 has occurred. The metric data 250 may comprise information about one or more metric values indicative of one or more quantitative measurements of operation or performance while executing one or more computational tasks. The metrics may include processor usage, memory usage, I/O interface usage, and so forth. The compromise module 136 may generate the UAV compromise data 138 in response to a determination that one or more of the metrics are equal to or greater than a threshold value.

The memory 230 may include the fail-safe module 140. The fail-safe module 140 may be configured to minimize harm, or potential harm, that may be caused to or by the UAV 102. The fail-safe module 140 may be configured to perform one or more actions in response to the generation of the UAV compromise data 138. In one example, the fail-safe module 140 terminates the navigation of the UAV 102 to the first computing device 104. In some implementations, the fail-module 140 causes the UAV 102 to land in response to the generation of the UAV compromise data 138. In other implementations, the UAV 102 may be configured to return to the location in which the UAV 102 began the navigation to the first computing device 104, or the UAV 102 may be configured to navigate to another location.

The fail-safe module 140 may be configured to render one or more circuits or the memory 230 inoperable. For example, the fail-safe module 140 may provide one or more of an electrical current or electrical voltage above a predetermined level to one or more circuits of the UAV 102 to render the circuits inoperable. In another example, contents of the memory 230 may be erased, wiped, destroyed, or otherwise rendered unreadable. For example, a memory scrubbing technique of writing multiple passes of random information to the memory 230 may be used. The fail-safe module 140 may render the one or more circuits or the memory 230 inoperable in response to a determination that the UAV 102 is positioned less than a threshold distance from an object. For example, the fail-safe module 140 may provide the electric current to one or more circuits of the UAV 102 in response to a determination that the UAV 102 is positioned 5 meters from Earth. Rendering the memory 230 inoperable may cause data stored on the memory 230 to be permanently deleted or inaccessible. By rendering one or more circuits or the memory 230 inoperable, the person 122 may be discouraged from stealing the UAV 102.

The fail-safe module 140 may be configured to deploy one or more devices or components to minimize, or attempt to minimize, potential damage that may occur to surrounding objects in the environment of the UAV 102. For example, the fail-safe module 140 may deploy at least one of the airbag 220, the foam 222, the parachute 224, or the bumper 226. The fail-safe module 140 may initiate special operating modes, such as configuring the rotors 228 for autorotation to retard a fall and provide for some lateral control over the UAV 102. The fail-safe module 140 may be configured to deploy the one or more devices or components in response to the generation of the UAV compromise data 138.

The fail-safe module 140 may be configured to cause the UAV 102 to disregard data received from at least one of certain sensors or other computing devices in communication with the UAV 102. For example, once a compromise occurs, the fail-safe module 140 may be configured to accept data from the proximity sensor 210(6) and ignore data received from the location sensor 210(1), the imager 210(2), the sun sensor 210(3), the compass 210(4), and so forth.

The memory 230 may include the alert module 142 configured to generate the alert data 144. The alert data 144 may comprise information indicating an occurrence of the compromise module 136 determining that a threat that may compromise the UAV 102 has occurred. One problem may be that the person 122 is using a wireless signal jammer to attempt to cause the UAV 102 to fall from the air. Another problem may be an overload of the UAV 102 because the UAV 102 may not have enough resources to handle an increase in the amount of hardware resource consumption. The alert module 142 may provide the alert data 144 to the server 108. The server 108 may be executing a monitoring service associated with an administrative user 146 of the UAV 102. The administrative user 146 may plan on how to solve any possible issues that may arise because of a threat that may compromise the UAV 102. For example, the administrative user 146 may plan to retrieve the UAV 102, or the administrative user 146 may contact the user 116 to inform the user 116 of the occurrence of the threat.

The memory 230 may include one or more other modules 252. For example, the one or more other modules 252 may be configured to manage administrative preferences, account information, and so forth. In another example, the one or more other modules 252 includes a user interface module configured to provide a user interface to the user 116 or to the UAV 102. In one implementation, the user interface may be a web interface presented via the network and accessible to the user 116 of the UAV 102. In another implementation, the user interface may comprise an application programming interface (API) that enables communication such as sending requests for data from the first computing device 104 to the UAV 102. The user interface may be presented using one or more output devices, such as the display 210(7), the speaker 210(8), and so forth. For example, the display 210(7) onboard the UAV 102 may be used to provide an emergency message to passersby, such as contact information for the administrative user 146, offer of a reward for safe return, and so forth.

The one or more other modules 252 may include a presentation module configured to present information using output devices of the UAV 102. For example, the presentation may include displaying the information using the display 210(7) of the UAV 102 or producing audio using speakers 210(8) of the UAV 102. In another example, the one or more other modules 252 may include a UAV control module configured to manage various components, devices, or systems of the UAV 102. In the fully autonomous mode, the UAV control module may be configured to manage, without human intervention, route selection, navigation, piloting, and so forth. In the semi-autonomous mode, the UAV control module may be configured to enable some human intervention. For example, the UAV control module may enable a human operator to designate or approve a particular navigational route. In some implementations, the UAV control module is remotely controlled by a pilot on the ground or in another mobile machine.

In some implementations, the memory 230 includes a data store 254 for storing information. The data store 254 may use a flat file, database, linked list, tree, or other data structure to store the information. In some implementations, the data store 254, or a portion thereof, may be distributed across at least one other device, such as a server 108, a network storage device, and so forth. As illustrated in FIG. 2, the data store 254 may include at least one of the location data 134, the trustworthy data 114, the malicious data 124, the UAV compromise data 138, the alert data 144, the image data 212, the sun data 214, the heading data 216, the audio data 218, the image data store 234, the command data 236, the energy consumption data 238, the heartbeat data 240, the damage data 246, the metric data 250, or other data 256. The other data 256 may include information such as administrator preferences, account information associated with users, and so forth.

The data in the data store 254 may be retained for performance improvement, troubleshooting, diagnostic, or other purposes. For example, the UAV compromise data 138 indicative of a compromise event may be retained, along with contemporaneous data such as the image data 212, heading data 216, audio data 218, command data 236, energy consumption data 238, damage data 246, metric data 250, and so forth.

The UAV 102 may be uncrewed in that there is no human operator aboard. Operation of the UAV 102 may be remotely controlled by a human operator at another location, such as in a control facility. In some implementations, the UAV 102 may be controlled at least in part by computers or other data processing devices at another location, such as in a datacenter.

The UAV 102 may be designed for non-military and non-law enforcement usage. For example, the UAV 102 may be configured to transport commercial cargo. The UAV 102 may be configured to transport packages from a distribution center to a residential home, business, and so forth. The UAV 102 may be described as non-military and not associated with or involved with the armed forces, law enforcement, or other sovereign entities.

The UAV 102 may be constructed to be relatively light in weight and having relatively limited capabilities as compared to human-operated devices. For example, an aerial UAV 102 may have limited altitude and range, compared to a human-crewed aircraft. Continuing the example, the UAV 102 may weigh less than 45 kilograms ("kg"), may be configured to fly at a maximum altitude of 3 kilometers, and may have a maximum range of 55 kilometers. In some implementations, the UAV 102 may be configured to have a maximum payload weight of 9 kg.

The UAV 102 may be configured to provide items proximate to the first computing device 104. For example, the UAV 102 may deliver items such as food, medicine, blankets, and so forth. The UAV 102 may utilize propellers, ducted fans, jets, envelopes containing a lighter-than-air gas, and so forth, to achieve and maintain flight. In some implementations, the UAV 102 may include at least one of fixed wings or propellers. In one example, the UAV 102 may utilize one or more propellers to enable takeoff and landing as well as a fixed wing configuration or a combination wing and propeller configuration to sustain flight while the UAV 102 is airborne.

Figure 3:
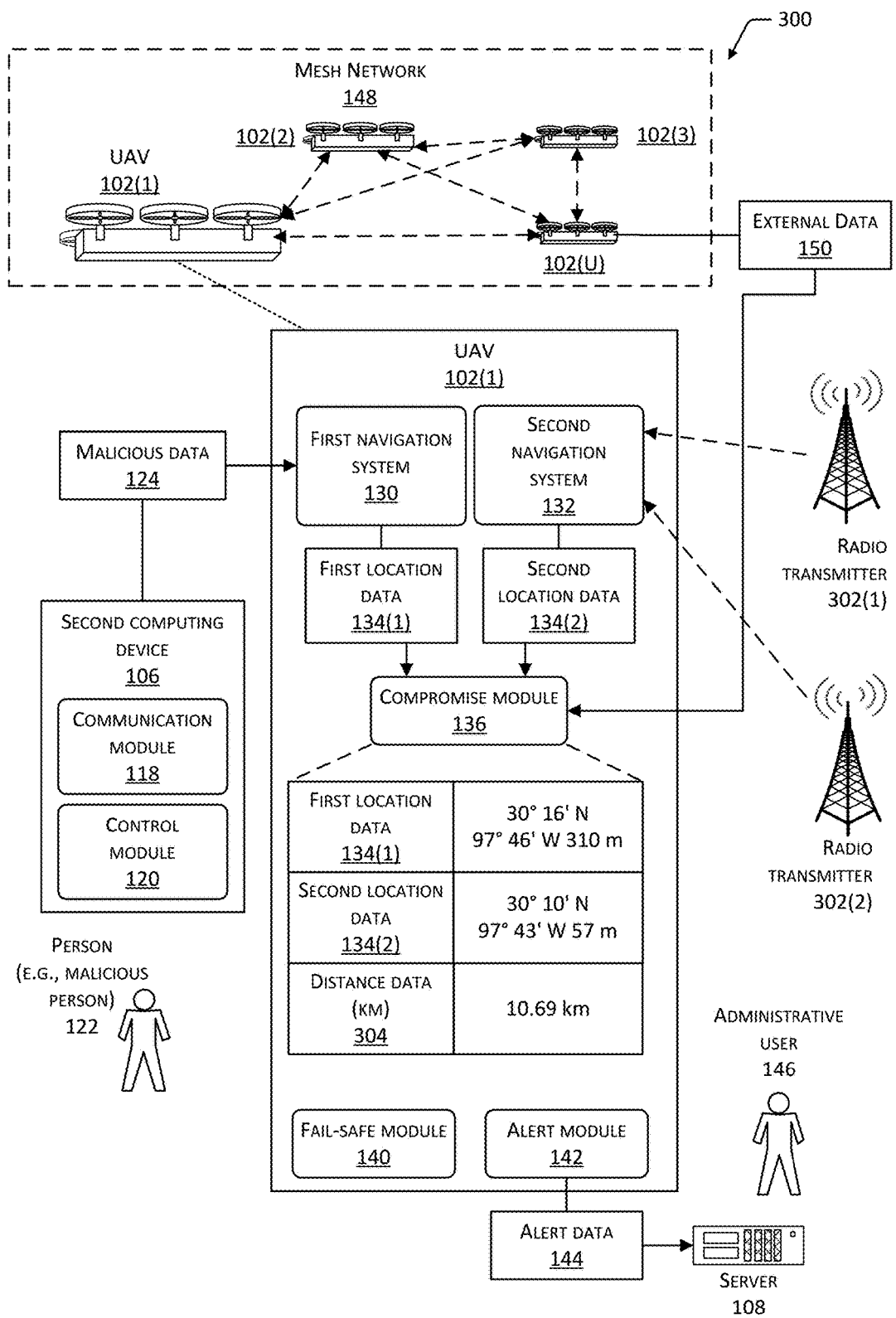
FIG. 3 illustrates a compromise module determining that a threat which may compromise the UAV has occurred based on different navigation systems determining different locations of the UAV as the UAV is in flight.

FIG. 3 is an illustration 300 depicting the compromise module 136 determining that a threat which may compromise the UAV 102 has occurred based on the different navigation systems determining different UAV 102 locations. Using at least one of the first or second wireless communication interfaces 126 or 128 (not shown), the UAV 102 may establish a communication link with the first computing device 104 (not shown). For example, the user 116 (not shown) may have placed an order for an item, and the UAV 102 may be in the process of navigating to a location proximate to the user 116.

In FIG. 3, the second computing device 106 is depicted and associated with the person 122. The second computing device 106 may be configured to cause a threat that may compromise the UAV 102 based on the transmission of the malicious data 124. Continuing with the example, the person 122 may be an adversarial person with the intent to steal the item that the UAV 102 is attempting to deliver to the user 116 (not shown).

The second computing device 106 may transmit the malicious data 124 to the UAV 102. The malicious data 124 may include synthetic GPS data that is used by the first navigation system 130 to determine a location of the UAV 102. The synthetic GPS data is not authentic. Using false identifying data to gain an illegitimate advantage may be referred to as a spoofing attack. In FIG. 3, the second computing device 106 performs a spoofing attack by providing the malicious data 124 to the UAV 102 to cause the UAV 102 to navigate to a location other than a legitimate location.

The first navigation system 130 uses the malicious data 124 as an input to generate the first location data 134(1). The first location data 134(1) represents a first location determination of the UAV 102. The first navigation system 130 may include a GPS receiver used to generate the first location data 134(1). The second navigation system 132 may comprise a radio position finding system. The second navigation system 132 uses data received from terrestrial radio transmitters 302(1) and 302(2) as inputs to determine the second location data 134(2). The terrestrial radio transmitters 302 may include those used for commercial broadcast, navigational transmissions, Wi-Fi® access points, cellular telephone network transmitters, and so forth. For example, information such as station service set identifiers ("SSIDs") received from Wi-Fi® access points may be used to determine the location of the UAV 102. The second location data 134(2) represents a second location determination of the UAV 102.

In some implementations, the compromise module 136 may utilize external data 150 such as received from one or more of the UAVs 102 in the mesh network 148. For example, the external data 150 may comprise location data 134(3) received from another UAV 102(U).

In FIG. 3, the compromise module 136 determines the distance between the locations indicated by the location data 134(1) and 134(2). The compromise module 136 generates distance data 304 indicating the distance between the locations indicated by the location data 134(1) and 134(2). In this example, the distance data 304 is expressed in kilometers ("km"). The first location data 134(1) comprises a latitude and longitude: 30° 16' N, 97° 46' W and may include an altitude of 310 m. The second location data 134(2) comprises a latitude and longitude: 30° 10' N, 97° 43' W and may include an altitude of 57 m. The compromise module 136 generates distance data 304 that indicates a distance of 10.69 km. In this example, the compromise module 136 is configured to determine an operation of the UAV 102 is compromised in response to a determination that the distance is greater than a threshold value. In this example, the threshold value includes a distance of 5 meters. Because the distance of 10.69 km is greater than 5 meters, the compromise module 136 determines operation of the UAV 102 is compromised.

The alert module 142 may generate the alert data 144 and transmit the alert data 144 to one or more of the server 108 or other UAVs 102 in the mesh network 148. As described below with regard to FIG. 8, in some implementations, other UAVs 102 may assist the compromised UAV 102.

The fail-safe module 140 of the compromised UAV 102 may terminate navigation to a previously designated destination and cause the UAV 102 to return to the location in which the UAV 102 was dispatched from, land, or take other remedial actions. For example, one of the remedial actions may be to disable the onboard first navigation system 130 and the second navigation system 132 and rely on command data 236 sent from another UAV 102 to navigate. In this example, a second UAV 102(2) may guide the compromised UAV 102(1) to a predetermined location such as a repair facility.

Figure 4:
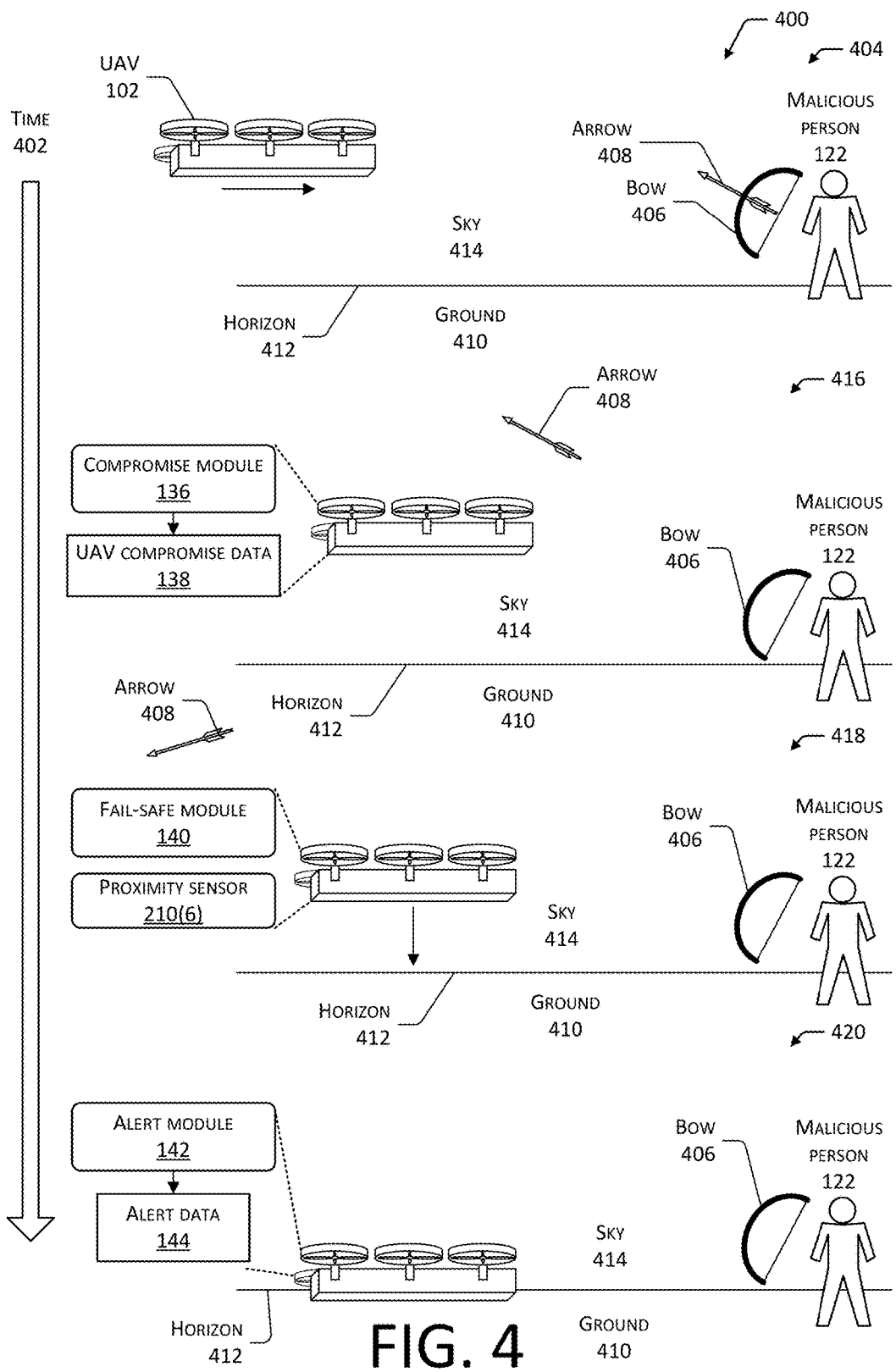
FIG. 4 illustrates a malicious person shooting an arrow proximate to the UAV, and the UAV landing on the ground.

FIG. 4 is an illustration 400 depicting the malicious person 122 shooting an arrow proximate to the UAV 102, and the UAV 102 landing on the ground. In this illustration, time 402 increases from top to bottom. At 404, the malicious person 122 is depicted using a bow 406 to aim an arrow 408 at the UAV 102 which is navigating to its destination. The malicious person 122 may be attempting to cause the UAV 102 to fall to ground 410, so that that malicious person 122 may steal or destroy the UAV 102. A horizon 412 is depicted as separating the ground 410 from sky 414.

At 416, the arrow 408 is depicted as being projected from the bow 406 towards the UAV 102. In this example, although the malicious person 122 intended for the arrow 408 to strike the UAV 102, the arrow 408 misses the UAV 102. The compromise module 136 detects the presence of the arrow 408 and generates the UAV compromise data 138 indicating that a threat exists that may compromise the UAV 102.

At 418, the fail-safe module 140 terminates the navigation to the first computing device 104, and the fail-safe module 140 directs the UAV 102 towards the ground 410. In some implementations, the fail-safe module 140 may be configured to direct the UAV 102 to take evasive maneuvers, navigate to a safe landing or parking zone for inspection, and so forth. The course of action taken, such as taking evasive maneuvers, landing immediately, and so forth, may be determined or designated by the administrative user 146 or another responsible party.

For example, should the compromise module 136 determine the UAV 102 has suffered a catastrophic failure of flight systems from an impact of the arrow 408, hardware failure, or that control of the UAV 102 has been compromised, the fail-safe module 140 may direct the UAV 102 to operate with the proximity sensor 210(6) to land the UAV 102. The fail-safe module 140 may also disregard data received from certain devices or systems other than the proximity sensor 210(6). In some implementations, the fail-safe module 140 may comprise a dedicated processor, control hardware, and so forth, such that the fail-safe module 140 may be isolated, at least in part, from the other operational components of the UAV 102 that may be compromised.

At 420, the UAV 102 has landed on the ground 410. For example, the fail-safe module 140 may have navigated the UAV 102 to a safe location such as a landing zone or parking lot that is away from the source of the threat. The alert module 142 generates the alert data 144. The alert data 144 may comprise information indicating the occurrence of the landing process and the last available or current location data 134 generated by the UAV 102. In some implementations, the alert module 142 may include audible or visual warnings provided to warn passersby away from the UAV 102.

Figure 5:
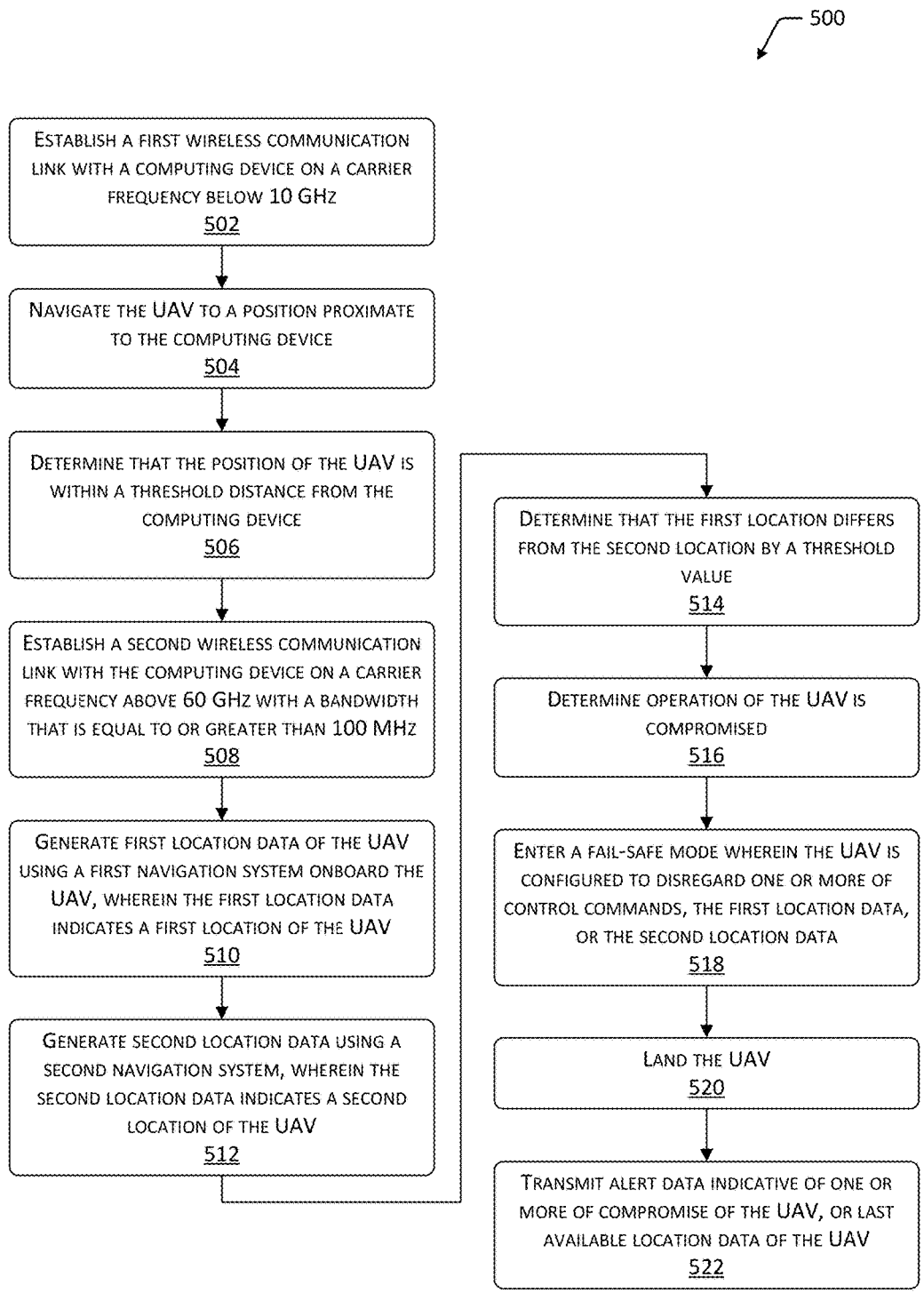
FIG. 5 is a flow diagram illustrating a process of establishing different wireless communication links between the UAV and a computing device, and determining that a threat which may compromise the UAV has occurred based on different navigation systems determining different UAV location data.

FIG. 5 is a flow diagram illustrating a process 500 of establishing different wireless communication links between the UAV 102 and a computing device (e.g., the first computing device 104), and determining that a threat which may compromise the UAV 102 has occurred based on different navigation systems (e.g., the first and second navigation systems 130 and 132) determining different UAV location data 134. The UAV 102 may implement the process 500. Although the process 500 is described with reference to the flowchart illustrated in FIG. 5, many other methods performing the acts associated with the process 500 may be used. For example, the order of the steps may be changed, some of the steps described may be optional, and additional steps may be included.

At 502, the UAV 102 establishes a first wireless communication link with a computing device on a carrier frequency below 10 GHz. The first wireless communication link may be established using a cellular wireless network. In one example, the UAV 102 establishes the first wireless communication link with the first computing device 104 in response to the first computing device 104 transmitting a request for an item (e.g., food) to be delivered proximate to the first computing device 104. The UAV 102 may receive the heartbeat data 240 from the first computing device 104 using the first wireless communication link. The UAV 102 may use the heartbeat data 240 to confirm the establishment of the first wireless communication link. The first wireless communication link may have an operational range equal to or greater than 100 meters.

At 504, the UAV 102 navigates to a position proximate to the computing device. In some implementations, the UAV 102 may be proximate to the computing device when the UAV 102 is able to establish a wireless communication link that uses wideband communication. In another example, the UAV 102 may be proximate to the computing device 104 when the UAV 102 is within a predetermined distance (e.g., 5 meters) of the first computing device 104.

At 506, the UAV 102 determines that the position of the UAV 102 is within a threshold distance from the computing device. For example, the proximity sensor 210(6) may generate information indicating that the UAV 102 is positioned within 9 meters of the first computing device 104.

At 508, the UAV 102 establishes a second wireless communication link with the computing device on a carrier frequency above 60 GHz with a bandwidth that is equal to or greater than 100 MHz. In one example, the second wireless communication link is executed using one or more of spread spectrum or frequency hopping. The UAV 102 may receive the heartbeat data 240 from the computing device using the second wireless communication link. The UAV 102 may use the heartbeat data 240 to confirm the establishment of the second wireless communication link. The second wireless communication link may have an operational range equal to or less than 100 meters.

At 510, the UAV 102 generates first location data 134(1) of the UAV 102 using a first navigation system 130 onboard the UAV 102. The first location data 134(1) indicates a first location of the UAV 102. At 512, the UAV 102 generates second location data 134(2) using a second navigation system 132. The second location data 134(2) indicates a second location of the UAV 102.

At 514, the UAV 102 determines that the first location differs from the second location by a threshold value. In one example, the threshold value comprises a distance of 9 meters. At 516, the UAV 102 determines operation of the UAV 102 is compromised.

At 518, the UAV 102 enters a fail-safe mode wherein the UAV 102 is configured to disregard one or more of control commands, the first location data 134(1), or the second location data 134(2). In some implementations, in response to a determination that one or more operations of the UAV 102 have been compromised, the UAV 102 dispenses foam 222. The foam 222 may be configured to cover at least a portion of one or more surfaces of the UAV 102. The foam 222 may be configured to absorb kinetic energy released during an impact between the UAV 102 and another object.

At 520, the UAV 102 lands. At 522, the UAV 102 transmits alert data 144 indicative of one or more of the compromise of the UAV 102 or the last available location data 134 of the UAV 102. In one example, the alert module 142 is configured to activate a strobe light to produce flashes of light which may be used by the administrative user 146 to find the UAV 102 that has landed. In yet example, the alert module 142 is configured to emit a sound during or after landing.

Figure 6:
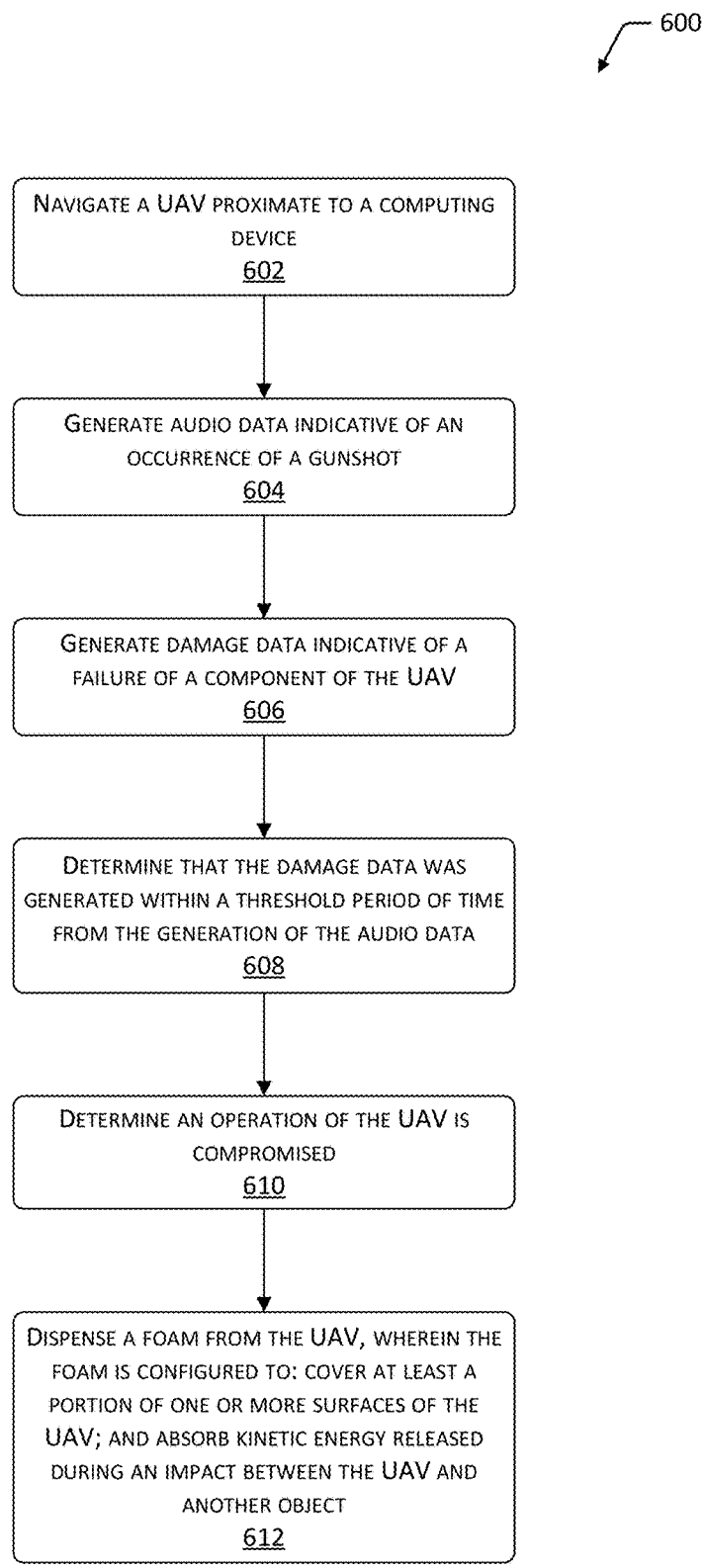
FIG. 6 is a flow diagram illustrating a process of determining that an operation of the UAV has been compromised based on audio data and damage data, and dispensing foam that covers at least a portion of a surface of the UAV.

FIG. 6 is a flow diagram illustrating a process 600 of determining that operation of the UAV 102 has been compromised based on audio data 218 and damage data 246, and dispensing foam 222 that covers at least a portion of a surface of the UAV 102. The UAV 102 may implement the process 600. Although the process 600 is described with reference to the flowchart illustrated in FIG. 6, many other methods performing the acts associated with the process 600 may be used. For example, the order of the steps may be changed, some of the steps described may be optional, and additional steps may be included.

At 602, the UAV 102 navigates proximate to a computing device. At 604, the UAV 102 generates audio data 218 indicative of an occurrence of a gunshot or passage of a high velocity projectile, such as from an airgun. At 606, the UAV 102 generates damage data 246 indicative of a failure of a component of the UAV 102. For example, a round of ammunition may strike a portion of the UAV 102 causing a component to fail.

At 608, the UAV 102 determines that the damage data 246 was generated within a threshold period of time from the generation of the audio data 218. For example, the damage data 246 occurred within 2 seconds of the audio data 218. At 610, the UAV 102 determines an operation of the UAV 102 is compromised.

At 612, the UAV 102 dispenses the foam 222. The foam 222 is configured to cover at least a portion of one or more surfaces of the UAV 102 and may also be configured to absorb kinetic energy released during an impact between the UAV 102 and another object.

Figure 7:
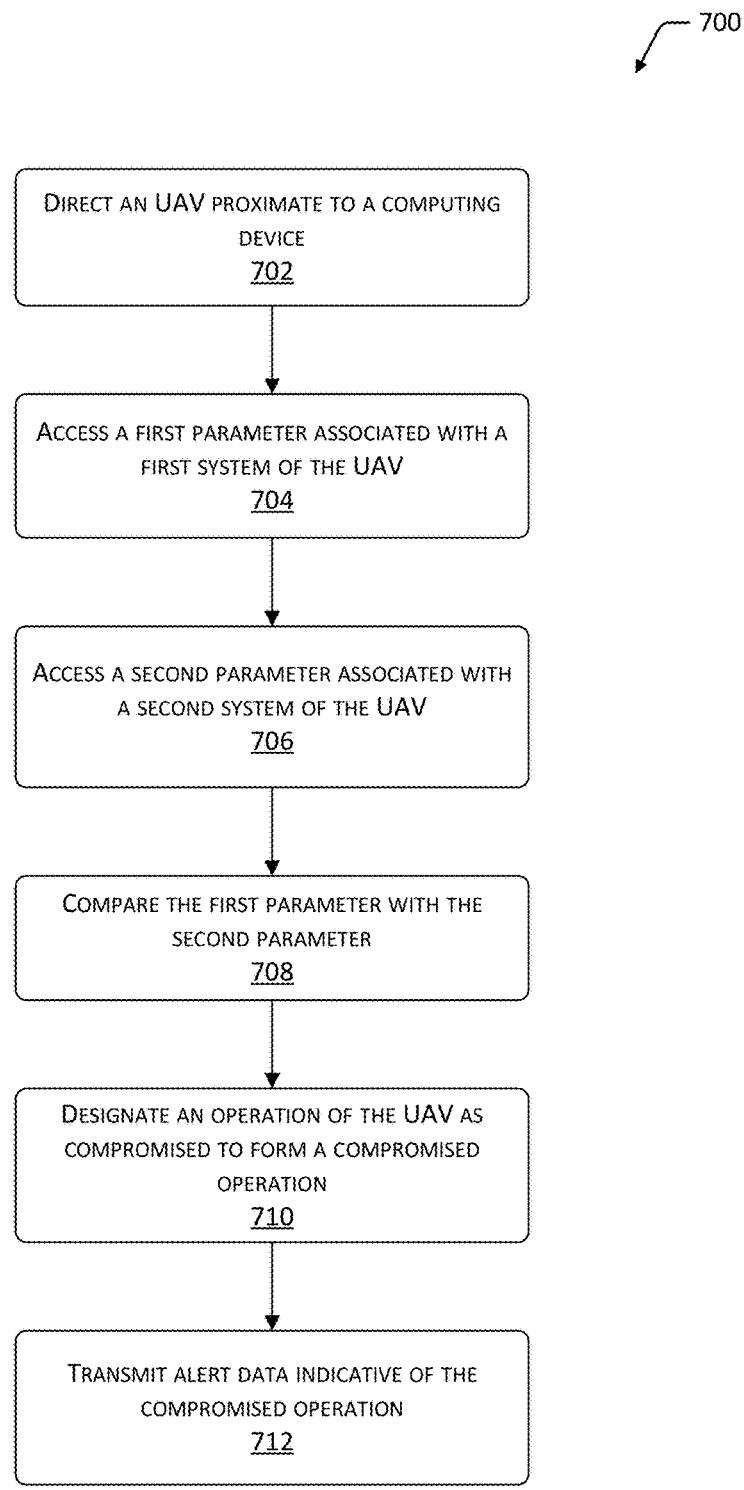
FIG. 7 is a flow diagram illustrating a process of determining one or more systems of the UAV are compromised based on a comparison of parameters associated with the one or more systems of the UAV.

FIG. 7 is a flow diagram illustrating a process 700 of determining one or more systems of the UAV 102 are compromised based on a comparison of parameters associated with systems of the UAV 102. The UAV 102 may implement the process 700. Although the process 700 is described with reference to the flowchart illustrated in FIG. 7, many other methods performing the acts associated with the process 700 may be used. For example, the order of the steps may be changed, some of the steps described may be optional, and additional steps may be included.

At 702, the UAV 102 directs itself proximate to a computing device. In one example, the UAV 102 is proximate to the first computing device 104 when the UAV 102 is located less than 10 meters from the first computing device 104.

At 704, the UAV 102 accesses a first parameter associated with a first system of the UAV 102. At 706, the UAV 102 accesses a second parameter associated with a second system of the UAV 102. At least one of the first parameter or the second parameter may comprise information about one or more values indicative of one or more quantitative measurements of operation or performance of the UAV 102 while executing one or more computational tasks. For example, the first parameter may comprise one or more of the data stored in the data store 254 (e.g., the location data 134, the trustworthy data 114, the malicious data 124, and so forth) depicted in FIG. 2. The second parameter may comprise one or more of the data stored in the data store 254 depicted in FIG. 2.

At 708, the UAV 102 compares the first parameter with the second parameter. For example, the compromise module 136 may compare the first location data 134(1) with the second location data 134(2) to determine the distance between the locations. In another example, the compromise module 136 may compare the image data 212 with data retrieved from the image data store 234 to determine when the image data 212 lacks any depictions of any objects that are expected to be included within the image data 212. In yet another example, the compromise module 136 may compare the audio data 218 with the damage data 246 to determine whether the damage data 246 was generated within a threshold period of time from the generation of the audio data 218.

At 710, an operation of the UAV 102 is determined as being compromised. For example, the compromise module 136 may generate the UAV compromise data 138 indicating that the first and second navigation systems 130 and 132, respectively, of the UAV 102 determined different locations for the UAV 102. At 712, the UAV 102 transmits the alert data 144 indicative of the compromised operation.

Figure 8:
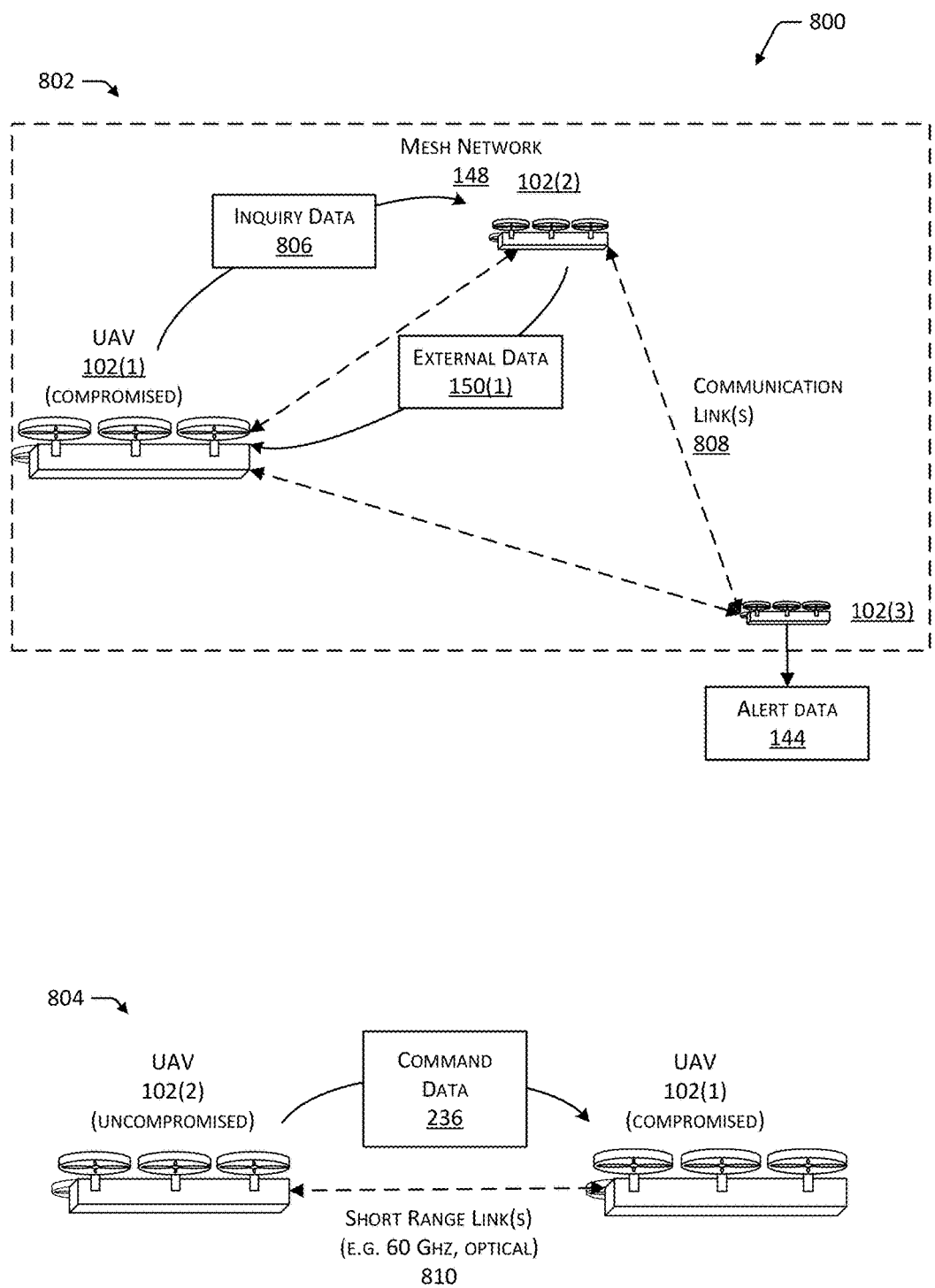
FIG. 8 illustrates interactions between UAVs in a mesh network.

FIG. 8 illustrates interaction between UAVs 102 in the mesh network 148. In this illustration, at 802, implementation of the mesh network 148 is depicted while at 804, one use of the mesh network 148 is depicted. The mesh network 148 provides for collaborative support and operation of a plurality of UAVs 102.

The UAVs 102 participating in the mesh network 148 may establish one or more communication links 808. The communication links 808 may be maintained using one or more of the first wireless communication interface 126 or the second wireless communication interface 128. The communications links 808 may be long range, short range. For example, the long range links may have a working distance of at least 100 meters, while the short range links may have a working distance of 100 meters or less.

The communication links 808 between the UAVs 102 in the mesh network 102 may be encrypted. For example, the communication links 808 may use symmetric encryption keys, public/private key pairs, digital certificates, and so forth to maintain security of the link. The communication links 808 may also utilize particular modulation schemes such as frequency hopping, spread-spectrum, and so forth, to further maintain security, reduce interference, and so forth.

The mesh network 148 may be fully connected or partially connected. For example, in a fully connected mesh network 148, each UAV 102 may be able to communicate with every other UAV 102 directly. In another example, the partially connected mesh network 148 may comprise a given UAV 102 establishing communication with those UAVs 102 within direct communication range, and relaying messages within the mesh network 148 for a predetermined number of times. Continuing the example, the mesh network 148 may be configured to relay a message only five hops.

In other implementations, other network topologies may be used. For example, ring networks, star networks, tree networks, hypertree networks, and so forth.

In this illustration, the compromise module 136 has generated UAV compromise data 138 indicating that the first UAV 102(1) is, or may be, compromised. The first UAV 102(1) sends inquiry data 806 to one or more other UAVs 102 in the mesh network 148. The inquiry data 806 may request the other UAVs 102 to respond with information about the first UAV 102(1) making the request based on the sensors 210 of the other UAVs 102. For example, the inquiry data 806 may send a request for current location data, in effect asking "where am I?".

One or more of the other UAVs 102(2), 102(3), . . . 102(U) may respond with external data 150. Continuing the example, the second UAV 102(2) may return external data 150(1) that includes estimated location data of the first UAV 102(1) at the time of the request. The first UAV 102(1) may use the external data 150(1) to confirm the compromise, or to reset onboard systems. For example, the first UAV 102(1) may use the external data 150(1) as initial data for the second navigation system 132, where the second navigation system 132 is configured to navigate by way of dead reckoning from inputs such as compass direction, time, and speed, relative to a known initial location.

In other implementations, the UAVs 102 in the mesh network 148 may send status information to others in the network. The status information may include location data 134, system data, and so forth. Based on this status information, the sensors 210 on the UAV 102, or both, a UAV 102 in the mesh network 148 may generate alert data 144 about another UAV 102. For example, third UAV 102(3) may detect that first UAV 102(1) is flying at an airspeed above a threshold while below a minimum altitude. As a result, the third UAV 102(3) may generate alert data 144 about the first UAV 102(1).

The alert data 144 may be provided to one or more other devices such as the other UAVs 102 in the mesh network 148 including the compromised UAV 102(1), the server 108, and so forth. In some implementations, the first UAV 102(1) determined as being compromised may respond to the receipt of the alert data 144. For example, the compromised UAV 102(1) may receive the alert data 144 for a previously undetected compromise, and may enter the fail-safe mode. Continuing the example, the fail-safe mode may direct the compromised UAV 102(1) to maintain a hover and recalibrate its altimeter and airspeed measuring device.

At 804, an uncompromised UAV 102(2) is assisting the compromised UAV 102(1). The compromised UAV 102(1) may be configured to enter a fail-safe mode in which the compromised UAV 102(1) responds to command data 236 sent using a short range link 810, such as the second wireless communication interface 128. The uncompromised UAV 102(2) may send commands using the short range link 810 guiding the compromised UAV 102(1) to a safe location. This mode may be used in situations where the compromise involves a software or sensor malfunction, and not flight hardware such as rotors 228.

Figure 9:
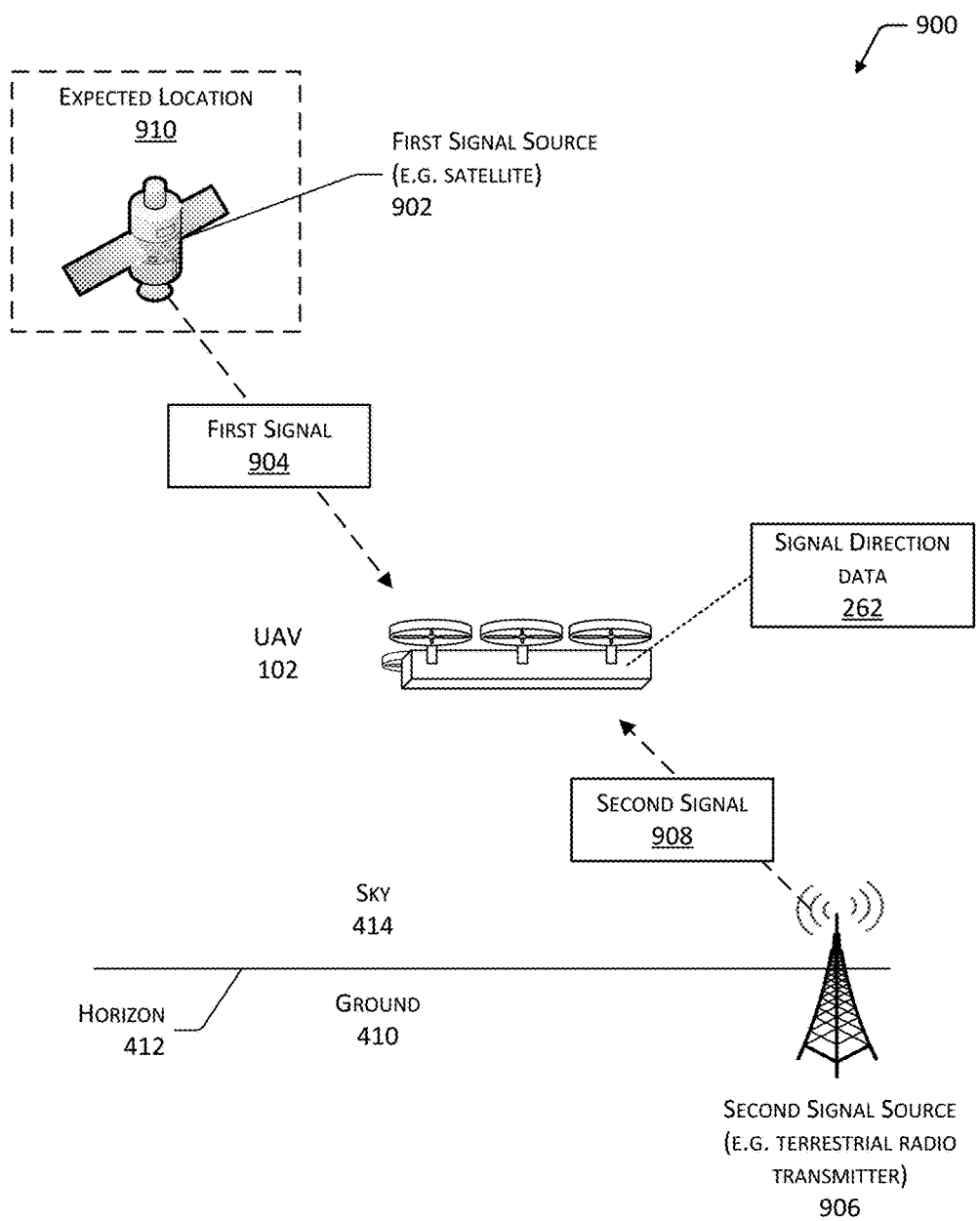
FIG. 9 illustrates a scenario in which direction of a signal is received by a UAV to determine a compromise.

FIG. 9 illustrates a scenario 900 in which direction of a signal received by a UAV 102 is used to determine a compromise. As described above, the directional array 260 is configured to determine a direction of a signal and generate signal direction data 262. The signal direction data 262 comprises information indicative of the direction from which a signal was received by the directional array 260. The signal direction data 262 may indicate an absolute direction (such as a compass heading) or a relative direction (such as a bearing, above, below, and so forth) relative to the UAV 102 to which the directional array 260 is affixed.

In this illustration, a first signal source 902 is overhead, such as a navigational satellite. The first signal source 902 may generate a first signal 904. Continuing the example, the navigational satellite may emit a navigational signal. A second signal source 906 is on or near the ground, and emits a second signal 908. For example, a terrestrial radio transmitter may emit the second signal 908. The second signal 908 may be intentionally emitted with the intent to compromise the UAV 102, or may be inadvertently transmitted such as due to a malfunction of the terrestrial radio transmitter.

The UAV 102 generates signal direction data 262 indicating the direction of one or more of the first signal 904 or the second signal 908. For example, the UAV 102 may be able to receive both signals simultaneously and determine the first signal 904 comes from above and to the right while the second signal 908 comes from below and to the left of the UAV 102. In other scenarios, the second signal 908 may overwhelm the first signal 904 such that only the second signal 908 is detected by the UAV 102.

The compromise module 136 may access source data 264 and generate an expected location 910 for the first signal source 902. Based on the expected location 910, the compromise module 136 may generate an expected direction. For example, the source data 264 may comprise data indicating that signals from navigational satellites are only proper when received from overhead, and thus the expected direction is overhead. A difference thus is present between the direction of the second signal 908 coming from below and the expected direction which is overhead. As a result, the compromise module 136 may generate UAV compromise data 138. Responsive to the UAV compromise data 138, one or more remedial actions may be taken, such as described in this disclosure.

Figure 10:
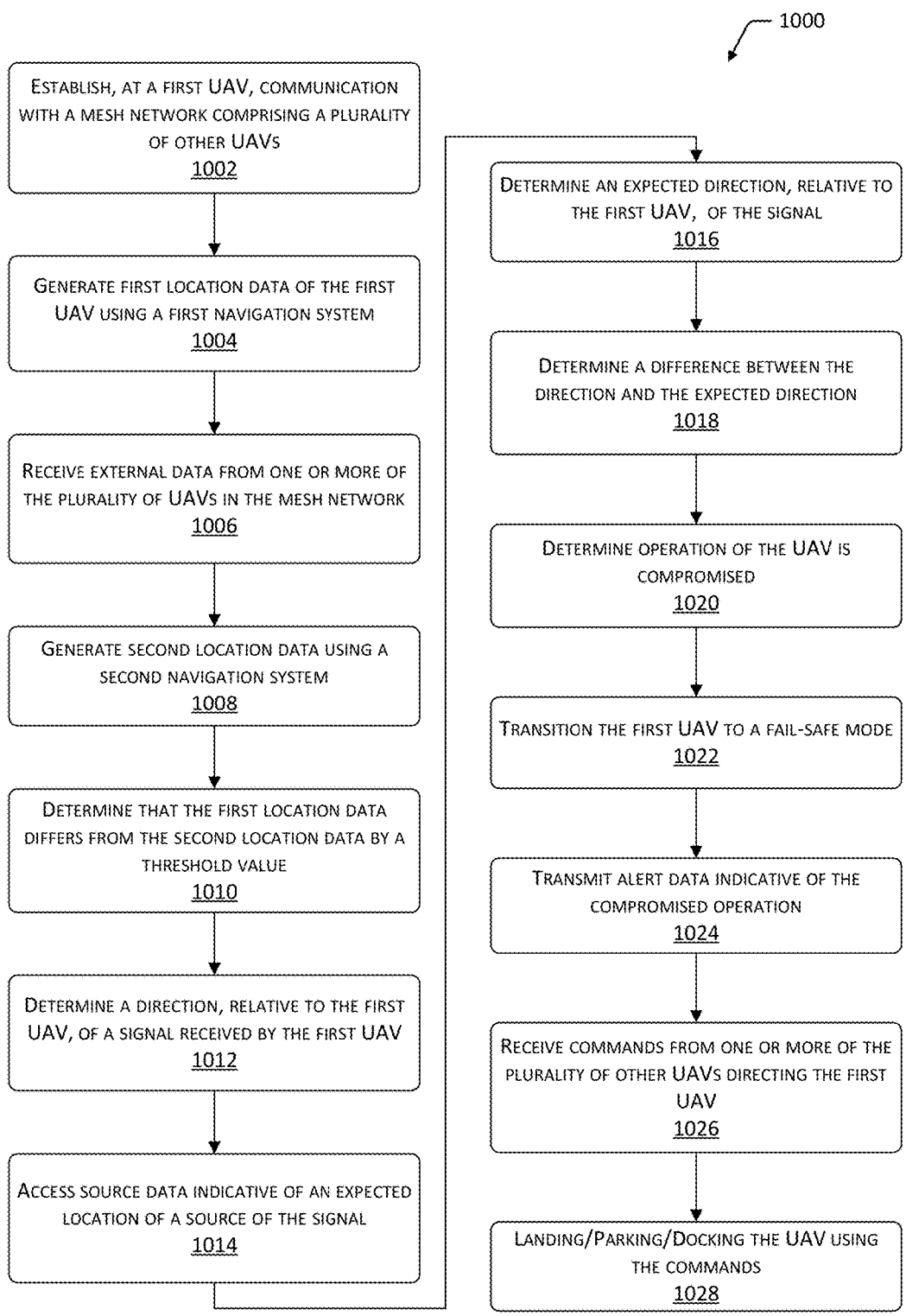
FIG. 10 is a flow diagram illustrating a process of determining a compromise of a first UAV based on data from two onboard navigation systems and external data from one or more UAVs in the mesh network.

FIG. 10 is a flow diagram illustrating a process 1000 of determining a compromise of a first UAV 102(1) based on data from two onboard navigation systems 130 and 132 and external data 150 from one or more UAVs 102(U) in the mesh network 148.

Block 1002 establishes communication with a mesh network 148 comprising a plurality of other UAVs 102(U). For example, the first UAV 102(1) may establish encrypted Wi-Fi® connections with other UAVs 102.

Block 1004 generates first location data 134(1) of the first UAV 102(1) using a first navigation system 130 onboard the first UAV 102(1). As described above, the first location data 134(1) indicates a first location of the first UAV 102(1). In some implementations, the location data 134 may include latitude, longitude, altitude, heading, speed, and so forth. For example, the first navigation system 130 may comprise a satellite navigation receiver.

Block 1006 receives external data 150 from one or more of the plurality of other UAVs 102(U) in the mesh network 148. For example, the external data 150 may comprise status information from other UAVs 102, information about the first UAV 102(1) as determined by the other UAVs 102, and so forth.

As described above, the external data 150 may comprise one or more of third location data 134(3) of one of the plurality of other UAVs 102(U), fourth location data 134(4) of the first UAV 102(1) as generated by the one of the plurality of other UAVs 102(U), a bearing between the first UAV 102(1) and the one of the plurality of other UAVs 102(U), or a distance between the first UAV 102(1) and the one of the plurality of other UAVs 102(U). For example, the external data 150 may comprise information from the third UAV 102(3) indicating the current location of the third UAV 102(3), and the bearing and distance of the third UAV 102(3) relative to the first UAV 102(1). By using the external data 150, the first UAV 102(1) may compare or replace the location data 134 from the onboard navigation systems 130 and 132 with that of an external device.

In some implementations, block 1006 may be omitted.

Block 1008 generates second location data 134(2) using a second navigation system 132. The second location data 134(2) indicates a second location of the first UAV 102(1). For example, the second navigation system 132 may use dead reckoning to determine position.

Block 1010 determines that the first location data 134(1) differs from the second location data 134(2) by a threshold value. For example, the threshold value may comprise 1 km, and the two locations may differ by 1.5 km.

Block 1012 determines a direction, relative to the first UAV 102(1), of a signal. For example, the directional array 260 may determine a direction of a first signal 904 received from a first signal source 902 such as a navigation satellite. The first signal 904 may be intended for use by the first navigation system 130.

Block 1014 accesses source data 264 indicative of an expected location 910 of a source of the signal. For example, the expected location 910 may be "above" the first UAV 102(1). In some implementations, the expected location 910 may be a direction indicating a particular compass heading and altitude or angle to the current location of the first signal source 902.

Block 1016 determines an expected direction of the signal. The expected direction may be determined based on one or more of the first location data 134(1), the second location data 134(2), time, or the source data 264. For example, the expected direction of the navigational signal may be a bearing and altitude of the navigation satellite as it appears in the sky given the current location of the first UAV 102(1) as indicated in the location data 134 and the almanac and ephemeris data of that satellite.

Block 1018 determines a difference between the direction and the expected direction. Continuing the example, the satellite may be expected to be above the first UAV 102(1), but the signal source may be below.

In some implementations, blocks 1012 through 1018 may be omitted.

Block 1020 determines operation of the first UAV 102(1) is compromised. For example, responsive to distance between the first location data 134(1) and the second location data 134(2) exceeding the 1 km threshold value, UAV compromise data 138 may be generated.

In implementations where block 1006 is not omitted, the determination may be based at least in part on the external data 150. For example, where the external data 150 indicates a third location data 134(3) that disagrees with others, the compromise may be determined.

In implementations where blocks 1012-1018 are not omitted, the determination may be based at least in part on the difference. For example, the difference of receiving a satellite navigation signal from the unexpected direction of the ground may result in the first UAV 102(1) deactivating the first navigation system 130.

Block 1022 transitions the first UAV 102(1) to a fail-safe mode. For example, the fail-safe mode may configure the first UAV 102(1) to disregard one or more of: command data 236 from either onboard or as received from an external source, the first location data 134(1), or the second location data 134(2). In some implementations, the fail-safe mode may invoke other remedial actions. In some implementations, block 1022 may be omitted.

Block 1024 transmits alert data 144 to one or more of the UAVs 102 in the mesh network 148, the server 108, or another device. The alert data 144 may be indicative of one or more of the compromise of the first UAV 102(1), last available location data 134 of the first UAV 102(1), status data of the first UAV 102(1), and so forth.

Block 1026 receives command data 236 from one of the plurality of other UAVs 102(U). The command data 236 may be configured to direct the first UAV 102(1) to a landing site, parking place, safe location, or other destination.

Block 1028 lands/parks/docks the first UAV 102(1) using the command data 236. For example, as depicted in FIG. 8, the uncompromised UAV 102(2) may control the compromised UAV 102(1) by way of the short range link 810 and guide it to the safe location.

In some implementations, a block (not depicted) may direct one or more of the UAVs 102(U) to maintain surveillance of the first UAV 102(1). For example, the UAVs 102(U) may overfly the first UAV 102(1), hover above the first UAV 102(1), and so forth. Surveillance may include, but is not limited to, acquisition of image data 212 of the first UAV 102(1) at the safe location.

Figure 11:
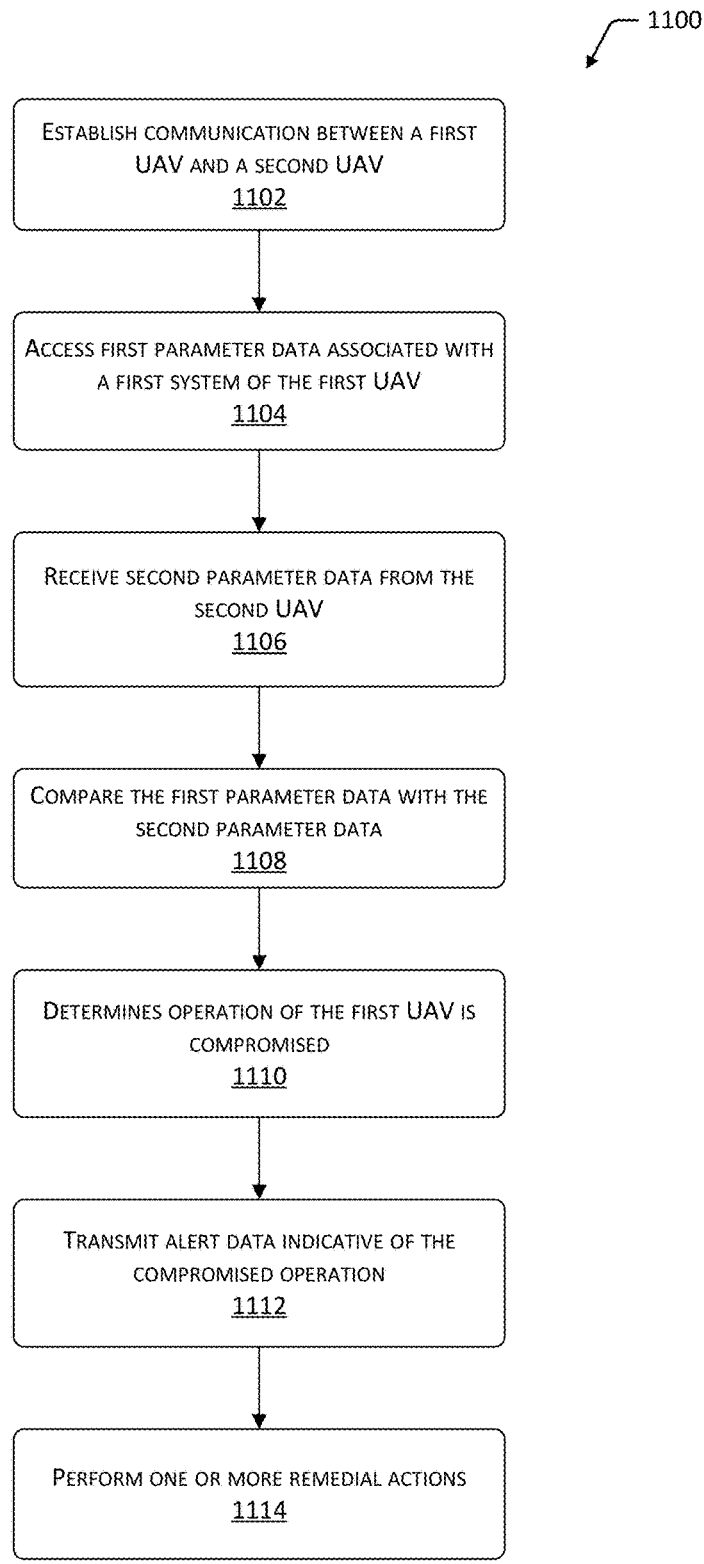
FIG. 11 is a flow diagram illustrating a process of determining one or more systems of the UAV are compromised based on a comparison of parameters associated with systems of a first UAV and a second UAV.

FIG. 11 is a flow diagram illustrating a process 1100 of determining one or more systems of the first UAV 102(1) are compromised based on a comparison of parameters associated with systems of another UAV(U).

Block 1102 establishes communication between a first UAV 102(1) and one or more other UAVs 102(U) such as a second UAV 102(2). As described above, the communication may comprise a mesh network 148 between the UAVs 102.

Block 1104 accesses first parameter data associated with a first system of the first UAV 102(1). For example, the first parameter data may indicate compromise information about one or more values indicative of one or more quantitative measurements of operation or performance of the first UAV 102(1). Continuing the example, the first parameter data may comprise location data 134, altitude, speed, heading data 216, and so forth.

Block 1106 receives second parameter data from the second UAV 102(2). Continuing the example, the second parameter data may comprise location data 134, altitude, speed, heading data 216, and so forth, of the second UAV 102(2), or of the first UAV 102(1) as determined by the second UAV 102(2). For example, the second UAV 102(2) detects the first UAV 102(1) with radar or lidar and determines a distance and direction of travel. Based on this information, the second UAV 102(2) may be able to determine the second parameter data of the first UAV 102(1).

Block 1108 compares the first parameter data with the second parameter data. For example, the heading as reported by the first UAV 102(1) may be compared with the heading of the first UAV 102(1) as reported by the second UAV 102(2).

Block 1110 determines operation of the first UAV 102(1) is compromised. For example, based on the difference between the headings, the first UAV 102(1) may determine that one or more of the first navigation system 130, the second navigation system 132, or one of the sensors 210 such as the compass 210(4) are compromised.

Other parameters may be used to determine compromise. For example, the first parameter data comprises first location data 134(1) indicative of a first location of the first UAV 102(1). The first location data 134(1) may be generated using a satellite-based navigation system, such as GPS of the first navigation system 130. The second parameter data may comprise second location data 134(2), indicative of a second location of the first UAV 102(1) as determined by the second UAV 102(2). For example, as described above, the second UAV 102(2) may use its known position in conjunction with radar data to determine the location of the first UAV 102(1). The determination that operation of the first UAV 102(1) is compromised may be responsive to a determination that the first location is different from the second location by a threshold distance. For example, threshold distance may comprise 50 meters and the first location and the second location may diverge by 200 meters, indicating a compromise of the satellite-based navigation system.

In another example, the first parameter data may comprise altitude data indicative of an altitude of the first UAV 102(1). The second parameter data may comprise altitude data indicative of an altitude of the second UAV 102(2) operating proximate to the first UAV 102(1). For example, the second UAV 102(2) may be configured to approach the first UAV 102(1) to a predetermined standoff distance and follow at the same altitude. The determination that operation of the first UAV 102(1) is compromised may be responsive to a determination that the first altitude data is different from the second altitude data by a threshold altitude. For example, a deviation of more than 3 meters in altitude may be indicative of a compromise.

In yet another example, the first parameter data may comprise first heading data 216(1) indicative of a first direction toward which the first UAV 102(1) is moving. For example, the first heading data 216(1) may be obtained from the compass 210(4), derived from the first navigation system 130 such as GPS, and so forth. The second parameter data may comprise second heading data 216(2) indicative of a second direction toward which the first UAV 102(1) is moving, as determined by the second UAV 102(2). The determination that operation of the first UAV 102(1) is compromised may be responsive to a determination that the first direction is different from the second direction by a threshold amount. For example, a deviation of more than 5 degrees in heading may be indicative of a compromise.

As described above, such as with regard to FIG. 9, direction of a received signal may be used to determine compromise. For example, the first parameter data may comprise data indicative of a first direction of a signal received by the first UAV 102(1). The second parameter data may comprise an expected direction of the signal. The determination that operation of the first UAV 102(1) is compromised may be responsive to a determination that the first direction is different from the expected direction by a threshold amount. For example, the expected direction may be "overhead" or "bearing 20 degrees, altitude 47 degrees" while the direction as actually received may be "below" or "bearing 195 degrees, altitude −87 degrees", indicating a compromise where the threshold either requires the same "side" of the UAV 102 or within 10 degrees of the expected direction.

In another example, the first parameter data may comprise metric data 250 representative of one or more metrics of the first UAV 102(1). For example, the one or more metrics are indicative of at least one of processor usage, memory usage, input/output interface ("I/O") usage, and so forth. The second parameter data is indicative of a threshold value. For example, other UAVs 102(U) in the mesh network 148 may provide data indicating a maximum of one or more of their metrics that may be used to set the threshold value. The determination that operation of the first UAV 102(1) is compromised may be responsive to a determination that one or more of the metrics are equal to or greater than the threshold value. For example, the other UAVs 102(U) in the mesh network 148 may be experiencing a maximum 5 second average of processor usage of 87%, which may be used as the threshold value. Should the processor usage of the first UAV 102(1) exceed this value, it may be determined to be compromised.

Block 1112 transmits alert data 144. The alert data 144 may be transmitted to, or received by, one or more of the UAVs 102 in the mesh network 148, the server 108, or another device. The alert data 144 may be indicative of one or more of the compromise of the first UAV 102(1), last available location data 134 of the first UAV 102(1), status data of the first UAV 102(1), and so forth.

Block 1114 performs one or more remedial actions. For example, the compromised first UAV 102(1) may be directed to change course and fly a particular compass heading, while the second UAV 102(2) follows and gathers additional parameter data to provide a check on the heading traveled. In another example, the first UAV 102(1) may assume a hover instead of lateral flight and during the hover may check that the sensors 210, such as an airspeed indicator, match the readings expected to be encountered while in a hover. The sensors 210 may then be recalibrated or adjusted based on the data acquired and additional checks performed by the compromise module 136 to determine if the compromise has been cleared and normal operation may resume. Should the compromise continue, the first UAV 102(1) may be directed to a safe location, such as by receiving command data 236 from another UAV 102(2) as described previously.

As described above with regard to FIG. 9, the compromised first UAV 102(1) may transition to a fail-safe mode, such as under the control of the fail-safe module 140, and may be configured to receive command data 236 from one or more of the second UAV 102(2), or a third UAV 102(3). Responsive to the command data 236, the first UAV 102(1) may be directed by the second UAV 102(2) to a designated location, such as a landing zone, repair facility, or the original destination to deliver a payload.

In some implementations, the compromised first UAV 102(1) may transition to a fail-safe mode, such as under the control of the fail-safe module 140. The remedial action may comprise a reset one or more systems of the first UAV 102(1) that are associated with the compromised operation. For example, the fail-safe mode may direct the first UAV 102(1) to enter a hover, land, park, or receive command data 236 from another UAV 102(U). While in the fail-safe mode, the system associated with the compromised operation may be powered off, may be power cycled (off and then on), may be re-initialized, and so forth. For example, at least a portion of the contents of the memory 230 may be erased or the data stored therein otherwise destroyed or rendered unreadable. In some situations, this reset or other remediation may be sufficient to clear the compromise. The first UAV 102(1) may then transition from the fail-safe mode back to the operating mode. If the compromise recurs, the compromise module 136 may initiate another remedial action.

In situations where the compromise may result in a loss of control or other event in which the UAV 102 may come into contact with another object, the remedial action may include performing one or more the following: activating an airbag 220, deploying foam 222, deploying a parachute 224, or deploying a bumper 226. For example, loss of functionality of a predetermined number of rotors 228 may result in deployment of a parachute 224 and activation of an airbag 220 prior to impact with the ground 410.

In some implementations, the remedial actions may be configured to disable the UAV 102. For example, a first UAV 102(1) which has been malicious redirected or stolen may be designed to self-disable such that it is non-functional. For example, upon determination that the operation of the first UAV 102(1) is compromised, one or more circuits in the first UAV 102(1) may be rendered inoperable by providing electrical current above a predetermined level to one or more circuits of the first UAV 102(1). Continuing the example, at 1 meter from the ground the first UAV 102(1) may electrically overload the processor 202, the memory 230, and so forth.

Figure 12:
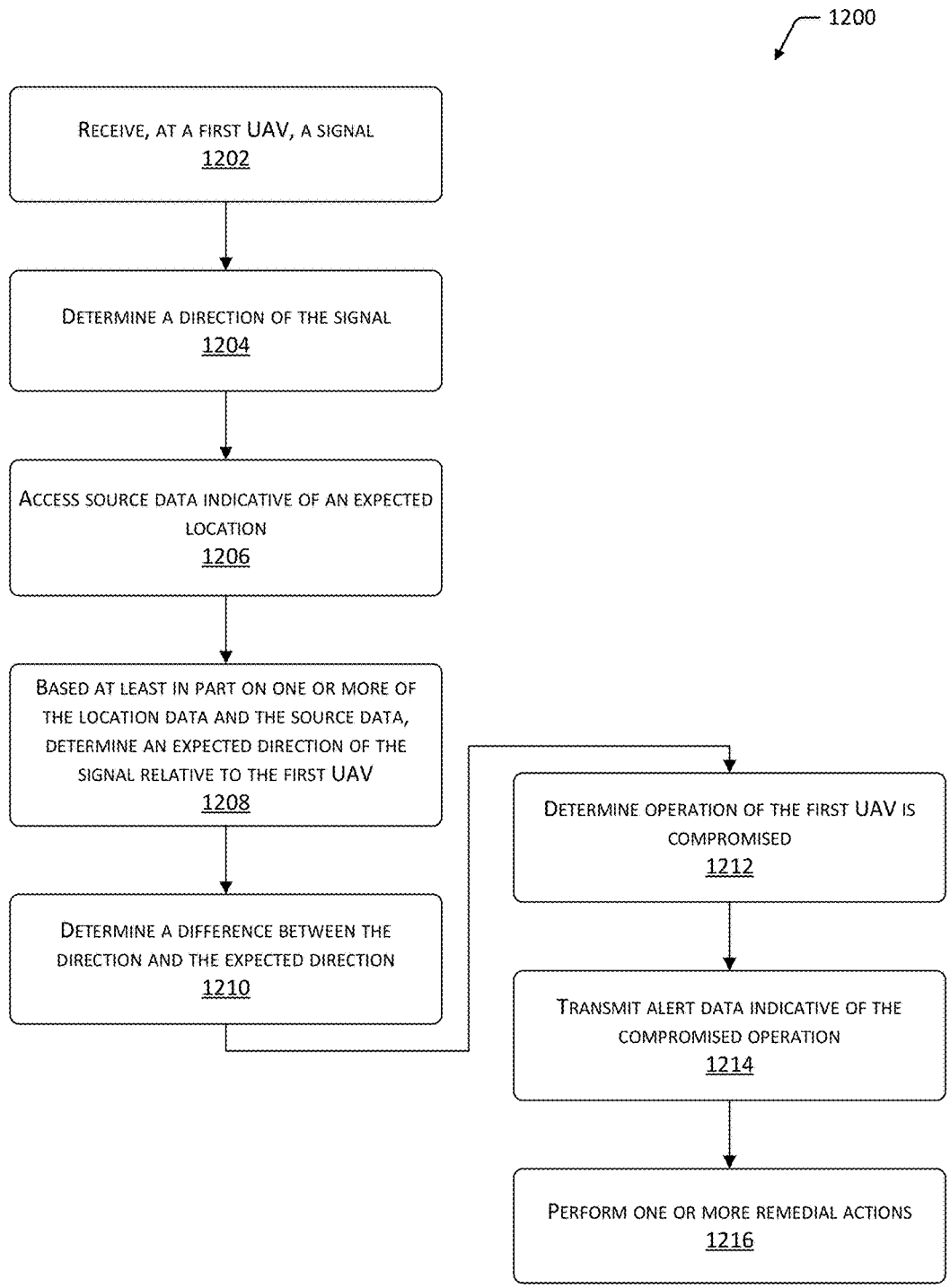
FIG. 12 is a flow diagram illustrating a process of determining compromise of the UAV based on a receipt of a signal from an unexpected direction.

FIG. 12 is a flow diagram illustrating a process 1200 of determining compromise of the UAV 102 based on a receipt of a signal from an unexpected direction. As described above with regard to FIG. 9, the UAV 102 may be equipped with a directional array 260 capable of providing signal direction data 262 indicating a direction of a signal. In one implementation, the directional array 260 may comprise one or more directional antennas exhibiting gain in one or more predetermined directions. For example, the directional array 260 may comprise horn antennas configured for microwave frequencies, with each horn mounted to receive an incoming signal from a different direction. Given the known orientation of the antenna relative to the UAV 102, the direction of the signal may be determined. In other implementations, other antennas may be used, such as corner reflectors, phased arrays, and so forth. Likewise, the signals may be optical. Likewise, other wavelengths including RF or optical may be used. For example, the directional array 260 may comprise detectors sensitive to infrared signals, each having a different field-of-view in a different direction.

Block 1202 receives a signal with the directional array 260. For example, one or more of the directional antennas having gain overhead, relative to the first UAV 102(1) may receive the signal.

Block 1204 determines a direction of the signal. Continuing the example, given that the signal is received by the directional antenna having a known field-of-view or gain pattern directed upward, the direction expressed in the signal direction data 262 may be determined as "overhead".

Block 1206 accesses source data 264 indicative of an expected location 910 of a source of the signal. For example, the source data 264 may indicate that the signal associated with satellite navigation should be received from an expected location 910 of "overhead". In another example, the expected location 910 may be determined based on the current location data 134 and information associated with the signal source, such as almanac and ephemeris data associated with a navigational satellite. With this example, the expected location 910 may be "heading 47 degrees, altitude 77 degrees". As described above, the source data 264 may comprise one or more of almanac data received from a satellite navigation system, ephemeris data received from the satellite navigation system, stored coordinates associated with the source, wherein the source is fixed, relative position data indicating the source is expected to be above or below, and so forth.

Based at least in part on one or more of the location data 134 or the source data 264, block 1208 determines an expected direction of the signal. Continuing the example, the expected direction may be "overhead", or the expected direction may be towards the navigational satellite.

In some implementations, the source of the signal may be another UAV 102(U). The expected location may be that of location data 134 of the other UAV 102(U). For example, the signal may comprise a transmission of external data 150 from the second UAV 102(2). The external data 150 may comprise the second location data 134(2) of the second UAV 102(2). The first UAV 102(1) may use the second location data 134(2) and the first location data 134(1) to determine the expected location of the second UAV 102(2) with respect to the first UAV 102(1). For example, the data may indicate that the second UAV 102(2) should be to the right of the first UAV 102(1). In this fashion, the UAVs 102 in the mesh network 148 may check one another using the external data 150, using not only the information contained in the external data 150, but the location of the origin of the signal transmitting the external data 150.

Block 1210 determines a difference between the direction and the expected direction. For example, the direction may be "below" and the expected direction may be "overhead".

Block 1212 determines operation of the first UAV 102(1) is compromised.

Block 1214 transmits alert data 144. The alert data 144 may be transmitted to, or received by, one or more of the UAVs 102 in the mesh network 148, the server 108, or another device. The alert data 144 may be indicative of one or more of the compromise of the first UAV 102(1), last available location data 134 of the first UAV 102(1), status data of the first UAV 102(1), and so forth.

Block 1216 performs one or more remedial actions. The remedial actions may comprise those described above with regard to FIG. 11, the following, or a combination thereof. For example, the compromised UAV 102(1) may receive command data 236 from the second UAV 102(2) to operate it, such as directing it to a safe location.

In one implementation, the remedial action may include receiving, from a second UAV 102(2), data indicative of a second difference between the direction and the expected direction of the signal as received at the second UAV 102(2). In this implementation, the second UAV 102(2) in the mesh network 148 attempts to determine if it detects the signal and whether the signal is coming from the expected direction. The determination that the first UAV 102(1) is compromised may be based at least in part on the data indicative of the second difference as received from the second UAV 102(2). For example, the second UAV 102(2) may provide confirmation that the signal was received from that unexpected direction, indicating a compromise.

As described above, the first UAV 102(1) may be equipped with a second navigation system 132. The second navigation system 132 may be configured to perform "dead reckoning" navigation to determine a location relative to an initial location, based on time, heading, speed, and so forth. In the event of a compromise of the first navigation system 130, the first location data 134(1) from the first navigation system 130 may be disregarded. The second UAV 102(2) may provide second location data 134(2) to the first UAV 102(1). The first UAV 102(1) may initialize the second navigation system 132 using the second location data 134(2) as the initial location. The second navigation system 132 using dead reckoning may then be used to direct the first UAV 102(1) to a predetermined location, such as a safe location. The second navigation system 132 may comprise one or more of a compass 210(4), a clock or timer, a speed measuring device, an altimeter, or another device. The speed measuring device may comprise a ground-sensing radar, pitot-tube system, speedometer measuring revolutions of a wheel, anemometer, and so forth.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of operating an uncrewed autonomous vehicle ("UAV") comprising:
   establishing, at the UAV via a communication interface, communication with a mesh network comprising a plurality of other UAVs;
   generating first location data of the UAV using a first navigation system onboard the UAV, wherein the first location data indicates a first location of the UAV;
   receiving external data from one or more of the plurality of other UAVs in the mesh network;
   generating second location data using a second navigation system, wherein the second location data indicates a second location of the UAV;
   determining that the first location data differs from the second location data by a threshold value;
   determining operation of the UAV is compromised based at least in part on the external data;
   transitioning to a fail-safe mode wherein the UAV is configured to disregard one or more of commands, the first location data, or the second location data; and
   transmitting alert data indicative of:
      the compromise of the UAV; and
      last available location data of the UAV.

2. The method of claim 1, wherein the external data comprises one or more of:
   third location data of one of the plurality of other UAVs,
   fourth location data of the UAV as generated by the one of the plurality of other UAVs,
   a bearing between the UAV and the one of the plurality of other UAVs, or
   a distance between the UAV and the one of the plurality of other UAVs.

3. The method of claim 1, further comprising:
   when the UAV is in the fail-safe mode, receiving commands from one of the plurality of other UAVs directing the UAV to a landing site;
   landing the UAV; and
   maintaining surveillance of the UAV by one or more of the plurality of other UAVs.

4. The method of claim 1, further comprising:
   determining a direction, relative to the UAV, of a navigational signal received by the first navigation system;
   accessing source data indicative of an expected location of a source of the navigational signal;
   based at least in part on the first location data and the source data, determine an expected direction of the navigational signal;
   determine a difference between the direction and the expected direction; and
   wherein the determining operation of the UAV is compromised is further based at least in part on the difference between the direction and the expected direction.

5. A system comprising:
   a communication interface;
   a memory storing computer-executable instructions; and
   a hardware processor in communication with the communication interface and the memory, the hardware processor configured to execute the computer-executable instructions to:
      establish communication between a first uncrewed autonomous vehicle ("UAV") and a second UAV;
      access first parameter data associated with a first system of the first UAV;
      receive second parameter data from the second UAV;
      compare the first parameter data with the second parameter data; and
      determine operation of the first UAV is compromised.

6. The system of claim 5, wherein:
   the first parameter data comprises first location data indicative of a first location of the first UAV;
   the first location data is generated using a satellite-based navigation system;
   the second parameter data comprises second location data indicative of a second location of the first UAV as determined by the second UAV; and
   the hardware processor is configured to execute computer-executable instructions to determine the operation of the first UAV is compromised in response to a determination that the first location is different from the second location by a threshold distance.

7. The system of claim 5, wherein:
   the first parameter data comprises first altitude data indicative of an altitude of the first UAV;
   the second parameter data comprises second altitude data indicative of an altitude of the second UAV operating proximate to the first UAV; and
   the hardware processor is configured to execute computer-executable instructions to determine the operation of the first UAV is compromised in response to a determination that the first altitude data is different from the second altitude data by a threshold altitude.

8. The system of claim 5, wherein:
   the first parameter data comprises first heading data indicative of a first direction toward which the first UAV is moving;
   the second parameter data comprises second heading data indicative of a second direction toward which the first UAV is moving, as determined by the second UAV; and
   the hardware processor is configured to execute computer-executable instructions to determine the operation of the first UAV is compromised in response to a determination that the first direction is different from the second direction by a threshold amount.

9. The system of claim 5, wherein:
the first parameter data is indicative of a first direction of a signal received by the first UAV;
the second parameter data comprises an expected direction of the signal; and
the hardware processor is configured to execute computer-executable instructions to determine the operation of the first UAV is compromised in response to a determination that the first direction is different from the expected direction by a threshold amount.

10. The system of claim 5, wherein:
the first parameter data comprises metric data representative of one or more metrics of the first UAV, wherein the one or more metrics are indicative of at least one of hardware processor usage, memory usage, or input/output interface ("I/O") usage;
the second parameter data is indicative of a threshold value; and
the hardware processor is configured to execute computer-executable instructions to determine the operation of the first UAV is compromised in response to a determination that one or more of the one or more metrics are equal to or greater than the threshold value.

11. The system of claim 5, wherein the first UAV comprises an aerial UAV; and
the hardware processor is configured to execute computer-executable instructions to, in response to the determination operation of the first UAV is compromised, execute computer-executable instructions to:
receive commands from one or more of the second UAV or a third UAV; and
responsive to the commands, direct the first UAV to a designated location.

12. The system of claim 5, wherein the hardware processor is configured to execute computer-executable instructions to, in response to the determination operation of the first UAV is compromised, execute computer-executable instructions to:
render one or more circuits inoperable by providing one or more of electrical current or electrical voltage above a predetermined level to the one or more circuits of the first UAV.

13. The system of claim 5, wherein the hardware processor is configured to execute computer-executable instructions to, in response to the determination operation of the first UAV is compromised, execute computer-executable instructions to:
reset one or more systems of the first UAV associated with the compromised operation.

14. The system of claim 5, wherein the hardware processor is configured to execute computer-executable instructions to, in response to the determination operation of the first UAV is compromised, execute computer-executable instructions to:
activating an airbag,
deploying foam,
deploying a parachute,
deploying a bumper, or
configure one or more rotors for autorotation.

15. A first uncrewed autonomous vehicle ("UAV") comprising:
a communication interface;
one or more directional antennas exhibiting gain in a predetermined direction;
a first navigation system configured to generate location data;
a memory storing computer-executable instructions; and
a hardware processor in communication with the communication interface and the memory, the hardware processor configured to execute the computer-executable instructions to:
receive a signal;
determine a direction of the signal using the one or more antennas;
access source data indicative of an expected location of a source of the signal;
based at least in part on one or more of the location data or the source data, determine an expected direction of the signal;
determine a difference between the direction and the expected direction;
determine operation of the first UAV is compromised; and
transmit alert data indicative of:
the compromise of the first UAV; and
last available location data of the first UAV.

16. The system of claim 15, wherein the hardware processor is configured to execute computer-executable instructions to:
receive, from a second UAV, data indicative of a second difference between the direction and the expected direction of the signal as received at the second UAV; and
wherein the determination that operation of the first UAV is compromised is based at least in part on the data indicative of the second difference as received from the second UAV.

17. The system of claim 15, wherein the hardware processor is configured to execute computer-executable instructions to, in response to the determination operation of the first UAV is compromised, execute computer-executable instructions to:
receive commands from a second UAV; and
operate the first UAV based on the commands.

18. The system of claim 15, further comprising a second navigation system comprising one or more of:
a compass,
a gyroscope,
an accelerometer,
a tilt sensor,
a clock,
a speed measuring device, or
an altimeter; and
wherein the hardware processor is configured to, in response to the determination operation of the first UAV is compromised, execute computer-executable instructions to:
disregard the location data from the first navigation system; and
receive second location data from a second UAV;
initialize the second navigation system using the second location data; and
direct the first UAV to a predetermined location using dead reckoning.

19. The system of claim 15, wherein the source data comprises one or more of:
almanac data received from a satellite navigation system,
ephemeris data received from the satellite navigation system,
stored coordinates associated with the source, wherein the source is fixed, or
relative position data indicating the source is expected to be above or below the first UAV.

20. The system of claim 15, wherein the source of the signal is a second UAV, and the expected location is of the second UAV.

* * * * *